(12) United States Patent
Lance et al.

(10) Patent No.: US 8,407,075 B2
(45) Date of Patent: Mar. 26, 2013

(54) MERGING CALENDAR ENTRIES

(75) Inventors: John M. Lance, Littleton, MA (US); David B. Cohen, San Francisco, CA (US); Bruce A. Kahn, Hudson, MA (US); Gregory R. Klouda, Lancaster, MA (US); Ram Krishnamurthy, Westford, MA (US); Deborah E. Maurer, Chicago, IL (US); Frank A. Pavelski, Bolton, MA (US); Michelle Stoner, Hubbardston, MA (US)

(73) Assignee: International Business Machines Corporation, Armonk, NY (US)

( * ) Notice: Subject to any disclaimer, the term of this patent is extended or adjusted under 35 U.S.C. 154(b) by 273 days.

(21) Appl. No.: 12/823,417

(22) Filed: Jun. 25, 2010

(65) Prior Publication Data
US 2011/0317523 A1    Dec. 29, 2011

(51) Int. Cl.
*G06Q 10/00* (2006.01)
(52) U.S. Cl. ............. 705/7.18; 705/7.11; 705/7.12; 705/7.13
(58) Field of Classification Search ......... 705/7.11–7.24
See application file for complete search history.

(56) References Cited

U.S. PATENT DOCUMENTS

| | | | | |
|---|---|---|---|---|
| 4,445,795 A * | 5/1984 | Levine et al. | ............. | 400/63 |
| 4,866,611 A * | 9/1989 | Cree et al. | ............. | 708/112 |
| 4,896,148 A * | 1/1990 | Kurita | ............. | 345/670 |
| 5,261,045 A * | 11/1993 | Scully et al. | ............. | 715/751 |
| 5,519,606 A * | 5/1996 | Frid-Nielsen et al. | ....... | 705/7.19 |
| 5,790,974 A * | 8/1998 | Tognazzini | ............. | 455/456.5 |
| 5,832,489 A * | 11/1998 | Kucala | ............. | 1/1 |
| 6,052,735 A * | 4/2000 | Ulrich et al. | ............. | 709/236 |
| 6,266,295 B1 * | 7/2001 | Parker et al. | ............. | 368/28 |
| 6,516,327 B1 * | 2/2003 | Zondervan et al. | ............. | 1/1 |
| 6,606,529 B1 * | 8/2003 | Crowder et al. | ............. | 700/100 |
| 6,820,088 B1 * | 11/2004 | Hind et al. | ............. | 1/1 |
| 6,993,522 B2 * | 1/2006 | Chen et al. | ............. | 1/1 |
| 7,039,596 B1 * | 5/2006 | Lu | ............. | 705/7.13 |
| 7,080,104 B2 | 7/2006 | Ring et al. | | |

(Continued)

FOREIGN PATENT DOCUMENTS

EP    2088547 A1 *    8/2009

OTHER PUBLICATIONS

IBM Authors, Method to Merge Seemingly Disparate Calendar Events, Database: IP.COM No. IPCOM000152425D, May 3, 2007.

(Continued)

*Primary Examiner* — Lynda Jasmin
*Assistant Examiner* — Alan S Miller
(74) *Attorney, Agent, or Firm* — Patrick B. Horne; Matthew W. Witsil; Moore & Van Allen PLLC

(57) ABSTRACT

A method, operable on a processing device, for merging calendar entries may include receiving a plurality of calendar entries each associated with entry identification data. The method may also include comparing by the processing device at least a portion of the entry identification data associated with each of the calendar entries. The method may additionally include merging, by the processing device, the calendar entries based at least in part on comparing of at least the portion of the entry identification data associated with each of the at least two calendar entries. The method may further include comparing at least one time attribute associated with each of the calendar entries and comparing at least one textual attribute associated with each of the calendar entries and basing merging the calendar entries additionally on comparing the time attributes and the textual attributes.

24 Claims, 17 Drawing Sheets

U.S. PATENT DOCUMENTS

| | | | |
|---|---|---|---|
| 7,340,484 B2 * | 3/2008 | S et al. | 1/1 |
| 7,346,808 B2 * | 3/2008 | Srinivasan et al. | 714/27 |
| 7,602,744 B2 * | 10/2009 | Kaikuranta et al. | 370/328 |
| 7,668,775 B2 | 2/2010 | Lu | |
| 7,814,055 B2 * | 10/2010 | Hullot et al. | 707/628 |
| 8,041,725 B2 * | 10/2011 | Grant et al. | 707/758 |
| 8,055,992 B2 * | 11/2011 | Raff | 715/203 |
| 2003/0129569 A1 | 7/2003 | Callaway et al. | |
| 2004/0044646 A1 * | 3/2004 | Hullot et al. | 707/1 |
| 2004/0225689 A1 * | 11/2004 | Dettinger et al. | 707/200 |
| 2004/0268270 A1 * | 12/2004 | Hill et al. | 715/963 |
| 2005/0102328 A1 * | 5/2005 | Ring et al. | 707/201 |
| 2006/0149609 A1 * | 7/2006 | Stenerson et al. | 705/8 |
| 2006/0190313 A1 * | 8/2006 | Lu | 705/8 |
| 2007/0265903 A1 * | 11/2007 | Blair et al. | 705/9 |
| 2008/0040188 A1 * | 2/2008 | Klausmeier | 705/9 |
| 2008/0071599 A1 * | 3/2008 | Muguda | 705/9 |
| 2009/0006328 A1 | 1/2009 | Lindberg et al. | |
| 2009/0037843 A1 * | 2/2009 | Dong et al. | 715/810 |
| 2009/0083062 A1 * | 3/2009 | Gupta | 705/1 |
| 2009/0089342 A1 * | 4/2009 | Runstedler et al. | 707/204 |
| 2009/0187814 A1 | 7/2009 | Raff | |
| 2009/0248480 A1 * | 10/2009 | Miksovsky | 705/9 |
| 2010/0031262 A1 | 2/2010 | Baird-Gent | |
| 2010/0083134 A1 * | 4/2010 | Gnech et al. | 715/753 |

OTHER PUBLICATIONS

WWW.TENDENCI.COM, Web Calendar Software with Online Event Registration.
WWW.SUPERSHAREWARE.COM, Workgroup Calendar for Outlook.
WWW.SUPERSHAREWARE.COM, Anti-Dupe for Microsoft Outlook.
WWW.BITPIM.ORG, Calendar Merge.

* cited by examiner

MERGING CALENDAR ENTRIES

BACKGROUND

Aspects of the present invention relate to electronic calendars, and more particularly to a method, system and computer program product for merging electronic calendar entries.

Electronic calendars, that is, calendars maintained on an electronic device such as a computer, have largely replaced paper calendars. Electronic calendars provide the user numerous benefits over paper calendars including the ability to input and save numerous calendar entries representing, for example, the user's appointments or meetings as well as recurring appointments or meetings. Electronic calendars typically provide the user an opportunity to provide a title, summary, and/or textual description of each calendar entry in addition to providing the date and start and end times for the calendar entry. In the case of a recurring calendar entry, the electronic calendar provides the user an opportunity to define parameters associated with the recurring calendar entry such as recurrence parameters defining how the calendar calculates the various recurrences of the entry.

Electronic calendars also provide the user an opportunity to consolidate multiple source calendars, for example, an organizational calendar, a workgroup calendar, an individual work calendar and a family calendar. Inevitably, calendar entries among the consolidated calendars represent similar or identical underlying events.

BRIEF SUMMARY

According to one aspect of the present invention, a method, operable on a processing device, for merging calendar entries may include receiving, by the processing device, a plurality of calendar entries each associated with entry identification data. The method may also include comparing, by the processing device, at least a portion of the entry identification data associated with each of the calendar entries. The method may also include merging, by the processing device, the calendar entries based at least in part on the comparing of at least the portion of the entry identification data associated with each of the at least two calendar entries to create a merged calendar entry.

According to another aspect of the present invention, a processing device may include a processor configured to receive a plurality of calendar entries each associated with entry identification data. The processor may include a module operable on the processor for merging calendar entries. The module may include a module for comparing at least a portion of the entry identification data associated with each of the calendar entries. The module may also include a module for merging the calendar entries based at least in part on the comparing of at least the portion of the entry identification data associated with each of the calendar entries to create a merged calendar entry.

According to another aspect of the present invention, a computer program product for merging calendar entries may include a computer readable storage medium having computer readable program code embodied therewith. The computer readable program code may include computer readable program code configured to receive a plurality of calendar entries each associated with entry identification data. The computer readable program code may also include computer readable program code configured to compare at least a portion of the entry identification data associated with each of the calendar entries. The computer readable program code may further include computer readable program code configured to merge the calendar entries based at least in part on the comparison of at least the portion of the entry identification data associated with each of the calendar entries to create a merged calendar entry.

According to another aspect of the present invention, a method, operable on a processing device, for merging calendar entries may include receiving, by the processing device, a plurality of calendar entries each associated with entry identification data. The method may also include comparing, by the processing device, at least a portion of the entry identification data associated with each of the calendar entries. The method may further include comparing, by the processing device, at least one time attribute associated with each of the calendar entries. The method may additionally include comparing, by the processing device, at least one textual attribute associated with each of the calendar entries. The method may also include merging, by the processing device, the calendar entries based at least in part on the comparing of at least the portion of the entry identification data associated with each of the calendar entries, based at least in part on comparing the time attributes associated with each of the calendar entries, and based at least in part on comparing the textual attributes associated with each of the calendar entries to create a merged calendar entry. The method may further include instructing, by the processing device, a display device to display the merged calendar entry.

BRIEF DESCRIPTION OF THE SEVERAL VIEWS OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION

Figure 1:
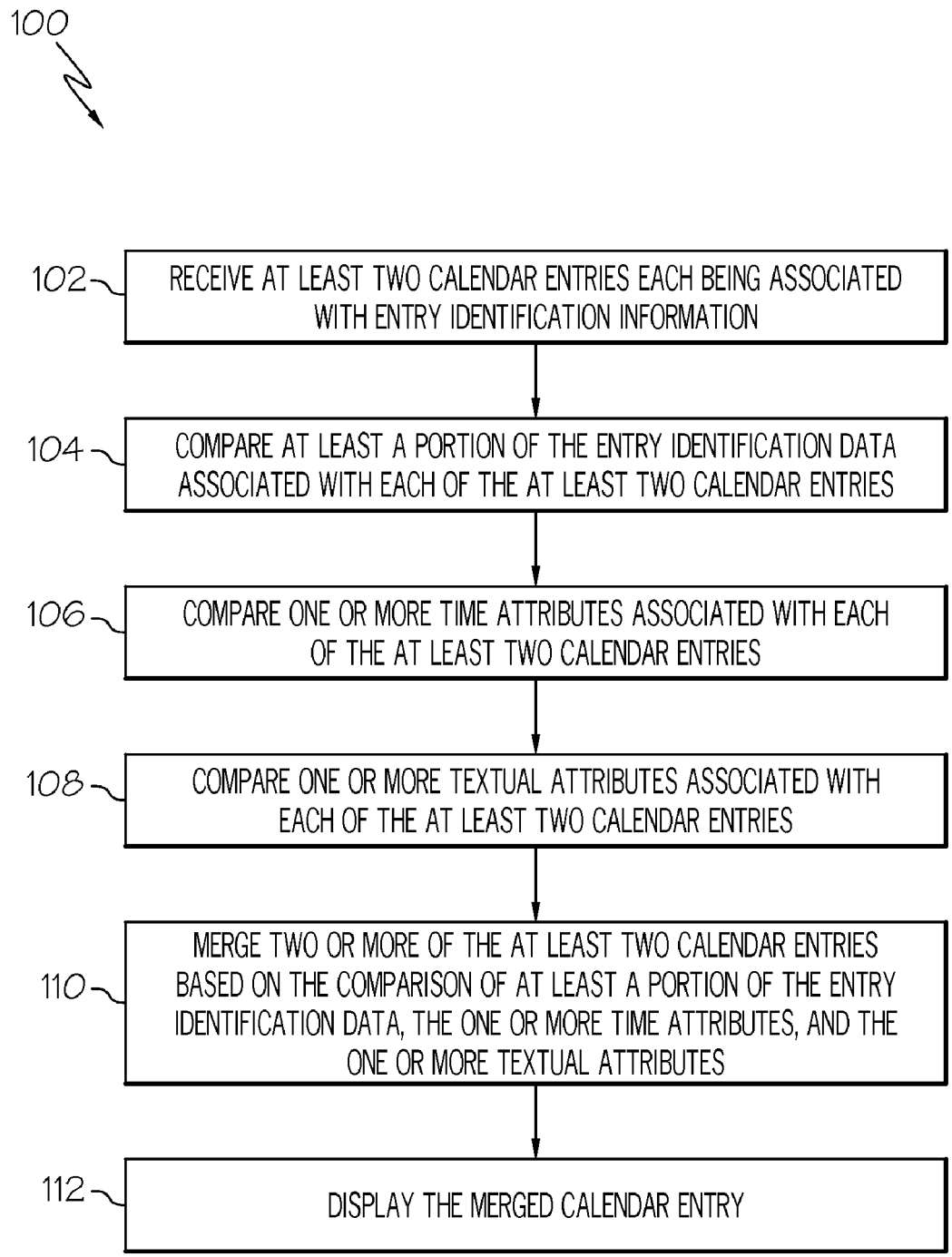
FIG. 1 is a flowchart of an example of a method for merging calendar entries in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a flowchart of an example of a method 100 for merging calendar entries in accordance with an embodiment of the present invention.

In block 102, the processing device receives at least two or a plurality of calendar entries each being associated with entry identification information (EID). The calendar entries, in some embodiments, originate from user input, and in some embodiments, originate from one or more electronic calendars. For example, in one embodiment, two source calendars are consolidated and one calendar entry from each of the two calendars is received at the processing device. Accordingly, the two or more calendar entries originate from a user who input the entries into an input device coupled with the processing device in some embodiments, and in others, the entries have previously been entered into two or more consolidated calendars. In some embodiments, receiving the calendar entries includes reading one or more of the calendar entries from one or more calendars, consolidated or separate. As used herein, user may be a single user of a group of users.

The term "entry identification information" or "EID" refers to any information, data or otherwise, associated with and providing identification information regarding the one or more calendar entries, recurring calendar entries, sets of calendar entries or the like. The EID includes a globally unique identifying value that it is assigned when each calendar entry is created in some embodiments and referred to herein as a "unique identifier". This unique identifier does not change because it is typically required to identify copies and/or versions of a calendar entry accurately regardless of possible changes to other information associated with the calendar entry. In various electronic calendar programs, the unique identifier is referred to by different names. For example, in IBM's Lotus Notes calendaring program, the unique identifier is referred to as a "UNID" and is associated with and saved alongside or as part of the calendar entry concurrently with or proximate in time with creation of the calendar entry.

IBM and Lotus Notes are trademarks of International Business Machines Corporation in the United States, other countries or both. In another example, the iCalendar standard for calendar data exchange (Request for Comment (RFC) 2445 et al.) terms the unique identifier a "UID". Most or all other electronic calendaring programs have a similar unique identifier or one or more items that fulfill the same role as the unique identifier, that is, providing a unique identification value for each calendar entry.

In block 104, the processing device compares at least a portion of the EID associated with each of the at least two calendar entries. In some embodiments discussed above, the EID includes unique identifiers that are compared by the processing device in an effort to determine whether the entries might be duplicates.

In a case where a calendar entry is part of a recurring set of entries, typically the entire set of recurring calendar entries is assigned the same unique identifier. Thus, a single unique identifier is insufficient to differentiate among instances within the set of recurring calendar entries absent additional distinguishable information. Within sets of recurring calendar entries, each calendar entry is assigned an identifier in addition to the unique identifier, which is referred to herein as the "additional identifier". This additional identifier need only be unique within the set of recurring entries and need not necessarily be globally unique, that is, unique with regard to identifiers of entries outside the recurring set. This additional identifier can take many different forms across various calendaring programs. For example, in IBM's Lotus Notes calendaring program, each individual calendar entry within a recurring set is additionally identified using the date and/or time the recurring entry originally was created. This value is stored as or as part of the "Repeat Instance Date" or "RID" information associated with each calendar entry within the set. As another example, in the iCalendar standard, the additional identifier is referred to as the "RECURRENCE-ID". As with the unique identifier, most or all electronic calendaring programs have a similar item or items that fulfill the same role as the additional identifier, specifically, providing identification information regarding each individual calendar entry within a recurring or repeating calendar set to supplement the information provided by the unique identifier assigned to each of the entries in the set.

Therefore, in block 104 the processing device, when necessary, compares both the unique identifier and the additional identifier of the at least two calendar entries. The unique identifier and the additional identifier are unchanging values. In other words, once they are determined and assigned or associated with a calendar entry, they are not changed. This allows a calendaring program to identify a particular calendar entry regardless of the calendar (e.g., business calendar, personal calendar, spouse's calendar, etc.) on which it appears. These unchanging calendar identifiers or attributes are used alongside changing or changeable identifiers or attributes during normal calendaring and scheduling workflow actions such as sending meeting invitations, accepting invitations, declining invitations, sending counter proposals or invitations, delegating meeting participation to other calendar users, and the like. Without use of both the unique identifier and the additional identifier, in most applications and embodiments, differentiating among calendar entries would be difficult or impossible.

In addition to the unique identifier and the additional identifier, a piece of information for differentiating among different versions of an entry must be used for calendaring and scheduling workflow actions to function properly. A value, referred to herein as a "sequence value" and also known as a version value, is assigned either at creation of the calendar entry or thereafter, and is changed when the calendar entry is rescheduled for a different start and/or end time and/or date. The sequence value, as with the unique identifier and the additional identifier, has different names in various calendaring programs. For example, in IBM's Lotus Notes calendaring program, the sequence value is referred to as the "SequenceNum", and according to the iCalendar standard, the sequence value is referred to as the "SEQUENCE". As with the unique identifier and the additional identifier, various calendaring programs have a similar item or items that fulfill a similar role as the sequence value.

Therefore, in block 104 the processing device compares, in some embodiments, the unique identifier, the additional identifier as well as the sequence value in order to determine whether each calendar entry is the same version of the same calendar entry and is duplicative.

Typically, the unique identifier, the additional identifier and the sequence value, which are all part of the EID in some embodiments, are not exposed to the user, but rather are only readable and writable by the calendaring program because the information has no real meaning to users. However, users do typically have control over entries on their personal and/or consolidated calendar. For example, users have the ability to change some values or attributes of calendar entries without disrupting calendaring and scheduling workflow. In one specific example, a user has been invited to participate in a meeting having an hour-long duration, but the user chooses not to attend the entire hour long meeting. The user can accept the meeting invitation from the meeting organizer for the entire hour long meeting and modify the start and/or end time of the calendar entry saved at the user's calendar to suit the user's desired time of attendance. Such a modification of the user's calendar entry need not, and will not necessarily, modify the start time/end time of the meeting organizer's calendar entry. The user's modification, in other words, because the changes do not affect the calendaring and scheduling workflow, does not disrupt further workflow by, for example, requiring a rescheduling of the meeting for all scheduled attendees.

In some embodiments wherein the unique identifier, the additional identifier and the sequence value are compared in block 104 and the entries are merged to create one merged calendar entry (as discussed in further detail below, see block 110), user confusion can result because one or more users have made changes to their specific calendar entries representing the same event such as a user changing his or her specific times of attending a meeting as described above. For example, if a user has accepted an invitation to an hour-long meeting but has modified his or her calendar entry representing the meeting to be only thirty minutes long, merging the organizer's entry with the user's entry would result in either a merged entry of an hour-long or thirty-minute long duration, depending on the parameters associated with the merging step, and perhaps which entry had priority over the other. In the case where the merged entry represents a thirty-minute long meeting, then the merged entry may give the user the impression the organizer of the meeting shortened the organizer's entry to thirty minutes, when in fact, the organizer did not. In the case where the merged entry represents an hour-long meeting, the merged entry could give the user the impression that the user's changes (that is, modifying the user's entry to thirty minutes) were lost, when in fact they were not, but are merely not shown on the face of the merged entry.

Thus, in blocks 106 and 108, the processing device compares additional attributes of the calendar entries to alleviate the potential confusion discussed above. It should be noted that some embodiments of the invention include only the comparison of block 104, and other embodiments include one or more of the comparisons of blocks 104, 106 and 108.

In block 106, the processing device compares one or more time attributes associated with each of the at least two calendar entries. In some embodiments, the time attributes include the starting and/or ending date and time of the compared entries.

In block 108, the processing device compares one or more textual attributes associated with each of the at least two calendar entries. In some embodiments, the textual attributes include textual descriptions of the calendar entries. For example, in one embodiment, the textual attributes include the title, name or summary of the calendar entries and in another embodiment, the textual attributes include the written description of the calendar entries. In other embodiments, various other textual attributes regarding various parameters of the calendar entry may also be compared.

In block 110, the processing device merges the two or more of the at least two calendar entries based on the comparison of at least a portion of the EID, the one or more time attributes, and the one or more textual attributes. In various embodiments, only a portion of the EID is compared before merging, and in others, some or all of the EID as well as one or more of the time attributes and/or textual attributes are compared before merging. The portion of the EID, the time attributes and/or the textual attributes being compared in a specific embodiment are referred to herein as the "relevant attributes". If one or more of the relevant attributes are determined not to match during one of blocks 104, 106 or 108, then the calendar entries having distinguishable relevant attributes are not merged. That is, the calendar entries are not considered to be the same entry and are therefore not combined in the merging step of block 110. Referring back to the example of the user's shortened thirty minute long meeting entry from above, the user's entry would not be merged with the organizer's entry in an embodiment including the time attributes as a relevant attribute. Regardless of identical unique identifier, additional identifier and sequence value, the entries would not be merged in such an embodiment because of the varying time attributes.

In an embodiment where the unique identifier, the additional identifier, and the sequence value are relevant attributes of the EID, if the unique identifier matches and one or both of the additional identifier and the sequence value do not match, the processing device considers the calendar entries to be different versions of the same entry. In such a case, the entries are typically not merged. Instead, in various embodiments, the processing device can visually indicate to the user there are differences such as "ghosting" the newest version onto the calendar so that the user can easily see the entry has different attributes, for example, the entry has been rescheduled. In cases where the compared entries are not part of sets of recurring entries, then the entries do not typically have additional identifiers, and therefore, the additional identifiers are not compared.

In block 112, the processing device instructs a display device to display the merged calendar entry. From the viewpoint of the user, the "merged calendar entry" appears as one calendar entry on the user's calendar as shown in FIG. 9B and discussed below. The merged calendar entry, in some embodiments, maintains many or all of the attributes of the source calendar entries being merged. For example, in one embodiment, the merged calendar entry includes information, such as information identifying the calendar of origin, or "source calendar," of the entries being merged, or "source calendar entries" (e.g., personal calendar, business calendar, etc.).

Figure 2:
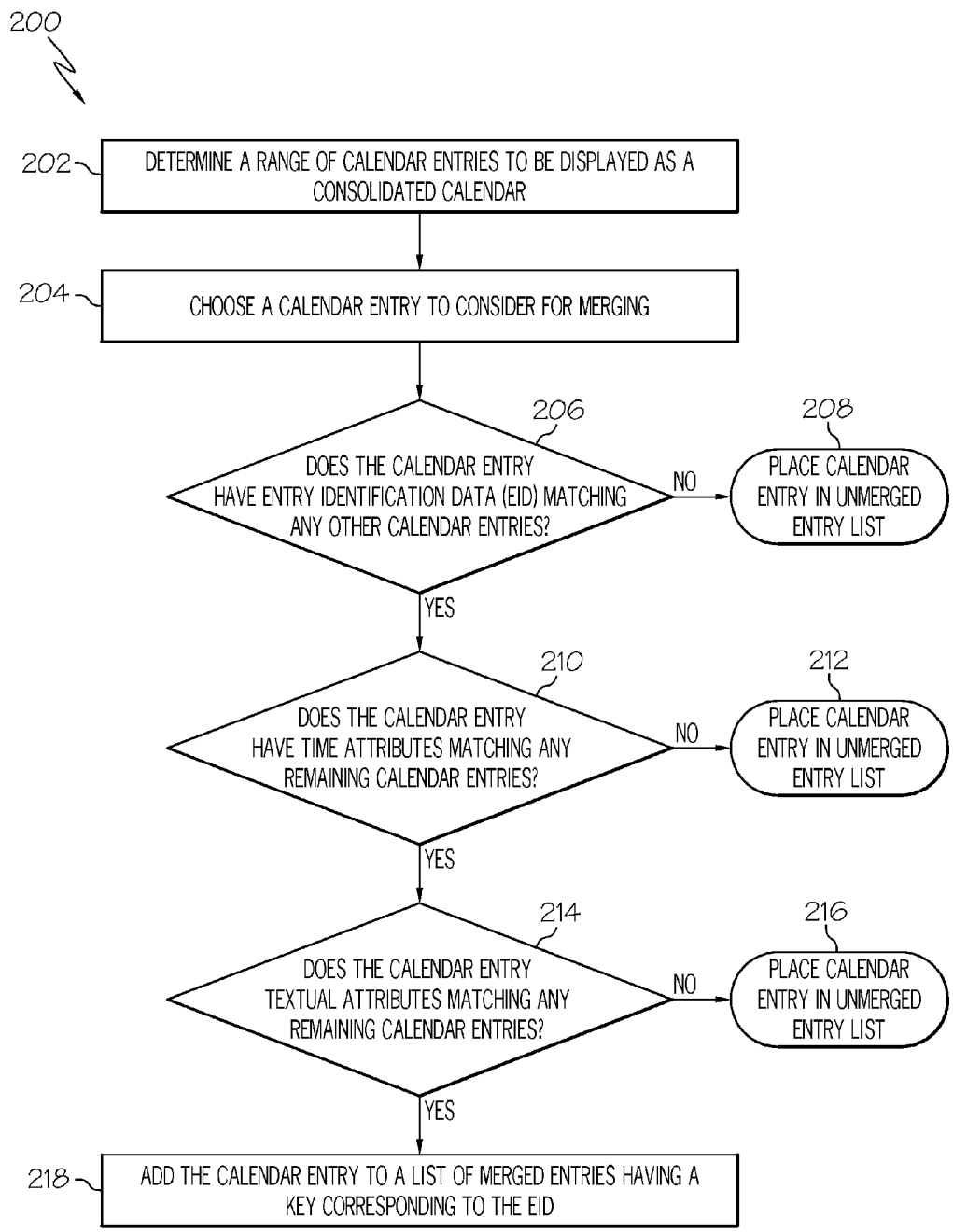
FIG. 2 is a flowchart of another example of a method for merging calendar entries in accordance with an embodiment of the present invention.

FIG. 2 is a flowchart including additional detail of an example of a method 200 for merging calendar entries in accordance with an embodiment of the present invention. In block 202, the processing device determines a range of calendar entries to be displayed as a consolidated calendar. In some embodiments, the user makes the range determination and inputs the determination into an input device. The processing device then receives information indicating the range of calendar entries to be displayed as a consolidated calendar.

In block 204, the processing device chooses a calendar entry to consider for merging. The processing device, in one embodiment, steps through the calendar entries from earliest in date/time to latest in date/time, and in other embodiments, steps through the entries using one or more other criteria. In one embodiment, the processing device chooses multiple calendar entries simultaneously or substantially simultaneously to consider for merging.

In block 206, the processing device determines whether the calendar entry chosen for consideration has entry identification information (EID) matching any of the other calendar entries. Block 206 is related to the comparison taking place in block 104 discussed above. In some embodiments, as discussed above, only a portion of the EID is considered, and in others, all of the EID is considered. The EID, in various embodiments includes one or more of the unique identifier, the additional identifier and the sequence value, and in various embodiments some or all of those are included in the relevant attributes to be considered in the comparison of calendar entries. The portion of the EID considered, be it some or all, is part of the "relevant attributes". If the portion of the EID being considered does not match the corresponding portion of the EID of another, second calendar entry, then the second calendar entry is placed in an unmerged entry list by the processing device, as represented by termination block 208. The unmerged entry list, in one embodiment, is a data file stored at a file system memory coupled with the processing device. Placement in the unmerged entry list indicates that one or more relevant attributes of the calendar entry and the second calendar entry are different. If the portion of the EID being considered does match the corresponding portion of the EID of the second calendar entry, then the second calendar entry is not placed in the unmerged entry list, but rather, the process proceeds to decision block 210.

In block 210, the processing device determines whether the calendar entry has time attributes matching any calendar entries not yet placed on the unmerged entry list. In other words, any of the calendar entries that were not previously placed on the unmerged entry list are compared to the entry being considered for merging. If any of the remaining calendar entries do not have the same time attributes, then they are placed in the unmerged entry list as represented by termination block 212. If any of the remaining calendar entries do have matching time attributes, they are not placed in the unmerged entry list, but rather, the process proceeds to decision block 214.

In block 214, the processing device determines whether the calendar entry has textual attributes matching the calendar entries not yet placed on the unmerged entry list. If any of the remaining calendar entries do not have the same textual attributes as the calendar entry being considered, then those entries are placed on the unmerged entry list as represented by termination block 216. As represented by block 218, if any of the remaining calendar entries do have the same textual attributes as the calendar entry being considered, then those entries are added to a list of merged entries. The list of merged entries, in some embodiments, has a key corresponding to a portion of the EID, such as the unique identifier.

In determining whether particular relevant attributes match, the processing device is preprogrammed to allow for particular tolerances. For example, in the most stringent case, the processing device is preprogrammed only to consider a match those attributes which match completely. Toward the other end of the spectrum, for example, the processing device can be preprogrammed to consider a match those attributes wherein only a smaller portion of the attributes are matching. As a more specific example, consider a case where a textual attribute is the summary or title of the calendar entry and this summary or title is considered a relevant attribute, and the calendar entry being considered for merging has a title of "Meeting to Discuss Merging Calendar Entries Project." One of the calendar entries being compared includes a title of "Meeting re Merging Calendar Entries." Of course, the titles are not identical, but could very well refer to the same meeting. In an embodiment where textual attributes are considered relevant and must match for merging entries, the processing device can be preprogrammed to consider entries to match one another if more than one word within the titles match. Based on that metric, the two titles would be considered a match in the example, because the words "Meeting," "Merging," "Calendar," and "Entries" all match. Of course, numerous variations and different implementations of this concept are envisioned such that the overseer or administrator of the calendaring program, which is, in some instances the calendar's user, can specify the tolerance for which relevant attributes are considered for match.

In some embodiments, the user is given an opportunity to manually command merging of two or more calendar entries regardless of the result of the comparison of relevant attributes between or among the source entries. In one embodiment, the user selects a calendar entry and executes a manual merge command by selecting the appropriate function from the action bar (see FIG. 9I, 922). The user is then prompted to select one or more additional calendar entries for merging. Once the user has specified the calendar entries to be merged, the processing device merges the selected calendar entries. In some embodiments, the user is also given an opportunity to provide one or more rules or parameters for manually merging entries, such as, for example, always retaining the user's calendar entry's display attributes regardless of other source calendar entries involved in the manual merge.

In some embodiments, the processing device gives the user, an administrator of the calendaring system, or some other person with appropriate authority, the option to set one or more policies preventing users from using the merging functionality of the system.

Figure 3:
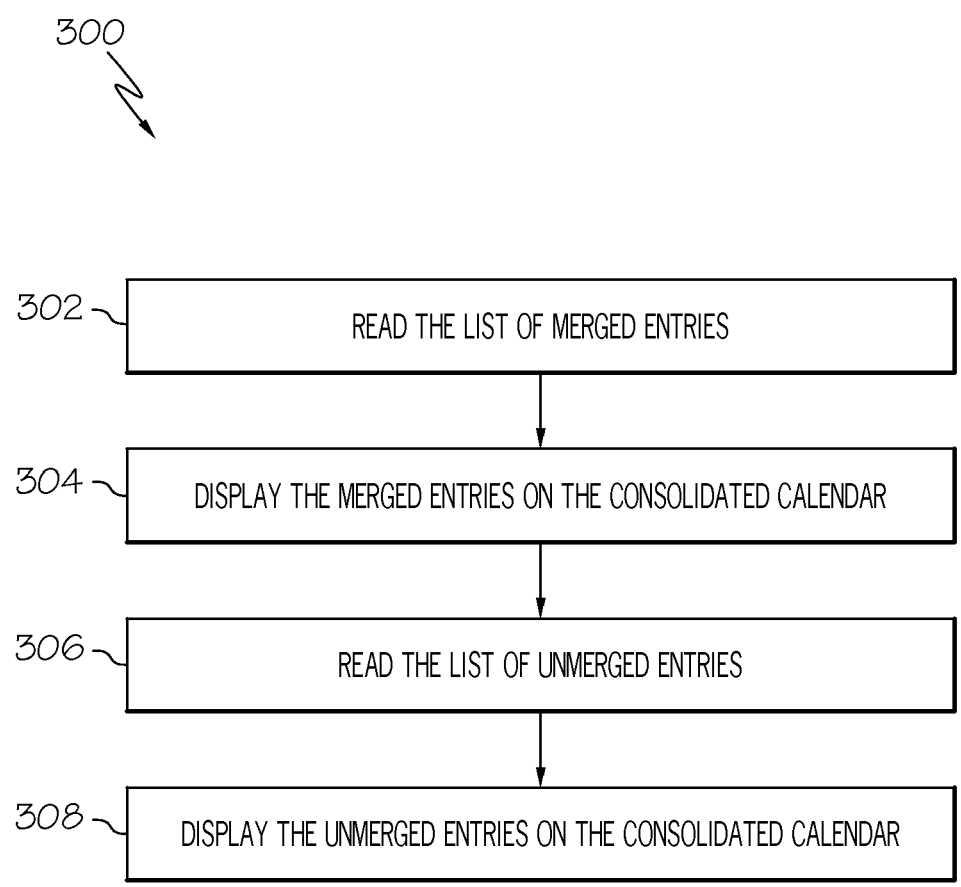
FIG. 3 is a flowchart of an example of a method for displaying merged calendar entries in accordance with an embodiment of the present invention.

FIG. 3 is a flowchart of an example of a method 300 for displaying merged calendar entries in accordance with an embodiment of the present invention. In block 302, the processing device reads the list of merged entries stored in or at the file system memory. In block 304, the processing device instructs the display device to display the merged entries on a consolidated calendar. The consolidated calendar is displayed via the calendaring program of the user. In some embodiments, the user has selected two or more calendars for concurrent display on one screen. As discussed above such calendars could, for example, be a business team calendar, a business organization-wide calendar, a personal calendar and the like. The user, in some embodiments, and as shown in FIG. 9C, has the opportunity to select or de-select a particular calendar for consolidation into the consolidation calendar. The consolidation calendar includes the merged entries read from the merged entries list.

In block 306, the processing device reads the list of unmerged entries from the file system memory. In block 308, the processing device instructs the display device to display the unmerged entries on the consolidated calendar. The steps of method 300 can take place in various orders or concurrently, for example, in one embodiment, steps 302 and 306 occur concurrently or substantially concurrently and steps 304 and 308 occur subsequent to steps 302 and 306 and concurrently or substantially concurrently with one another.

In various embodiments, the relevant attributes compared by the processing device to determine whether to merge two or more source calendar entries also includes one or more of attendee lists, system specific identifiers (if available), source calendars and the like as well as those previously discussed.

Figure 4:
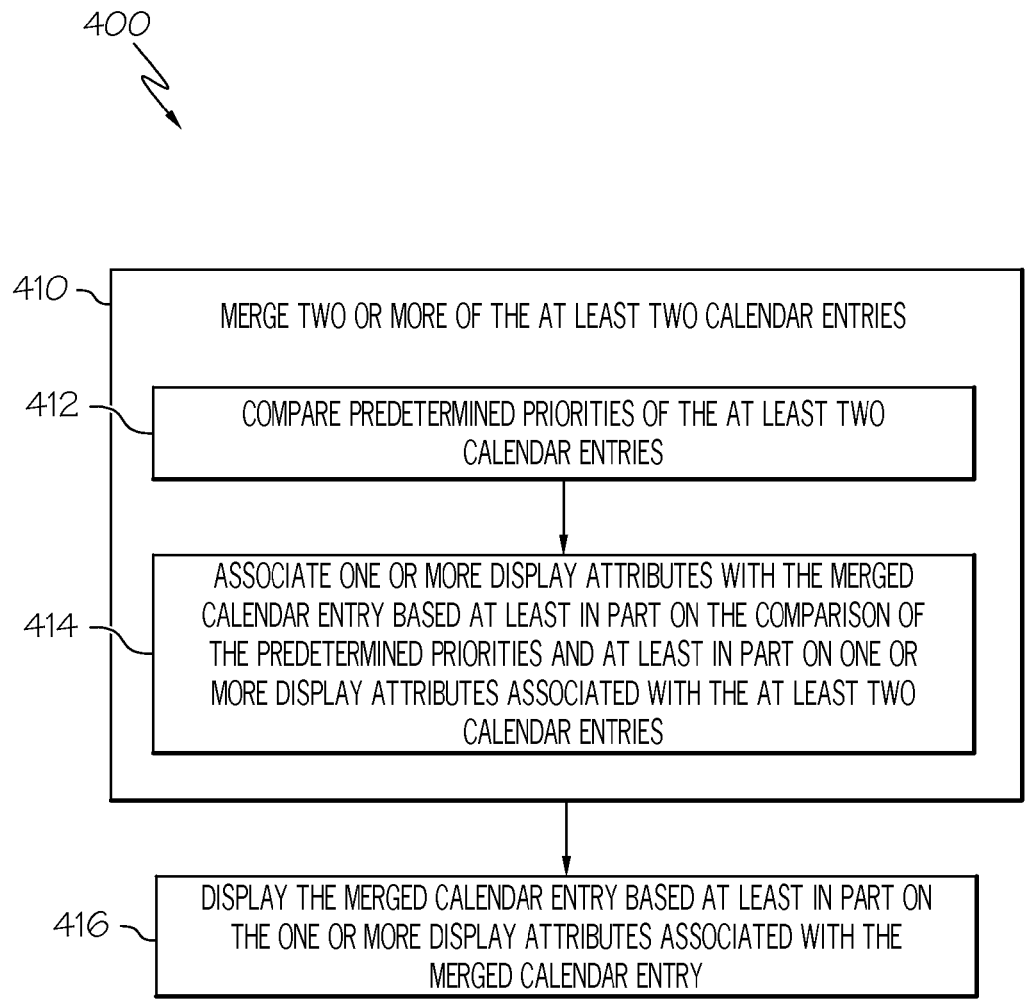
FIG. 4 is a flowchart of an example of a method for displaying merged calendar entries based on predetermined priorities in accordance with an embodiment of the present invention.

FIG. 4 is a flowchart of an example of a method 400 for displaying merged calendar entries based on predetermined priorities in accordance with an embodiment of the present invention. Block 410 corresponds to block 110 of FIG. 1 and represents the processing device merging the at least two calendar entries. In this method 400, step 410 includes the processing device comparing predetermined priorities of the at least two calendar entries as represented by block 412. Step 410 also includes the processing device associating one or more display attributes with the merged calendar entry based at least in part on the comparison of the predetermined priorities and at least in part on one or more display attributes associated with the at least two calendar entries as represented by block 414. A display attribute is an attribute of a calendar entry displayed in association with the calendar entry to assist the user in identifying and/or categorizing the calendar entry. Examples of display attributes include color, shading, patterning, shape and the like.

In some embodiments, in instances where the user's calendar is not a source calendar for a merged calendar entry, then a distinct display attribute is used, such as a grey color. The user has the opportunity in some embodiments to prioritize the source calendars and/or source entries in order that the display attributes of the highest priority source is associated with the merged entry.

Figure 5:
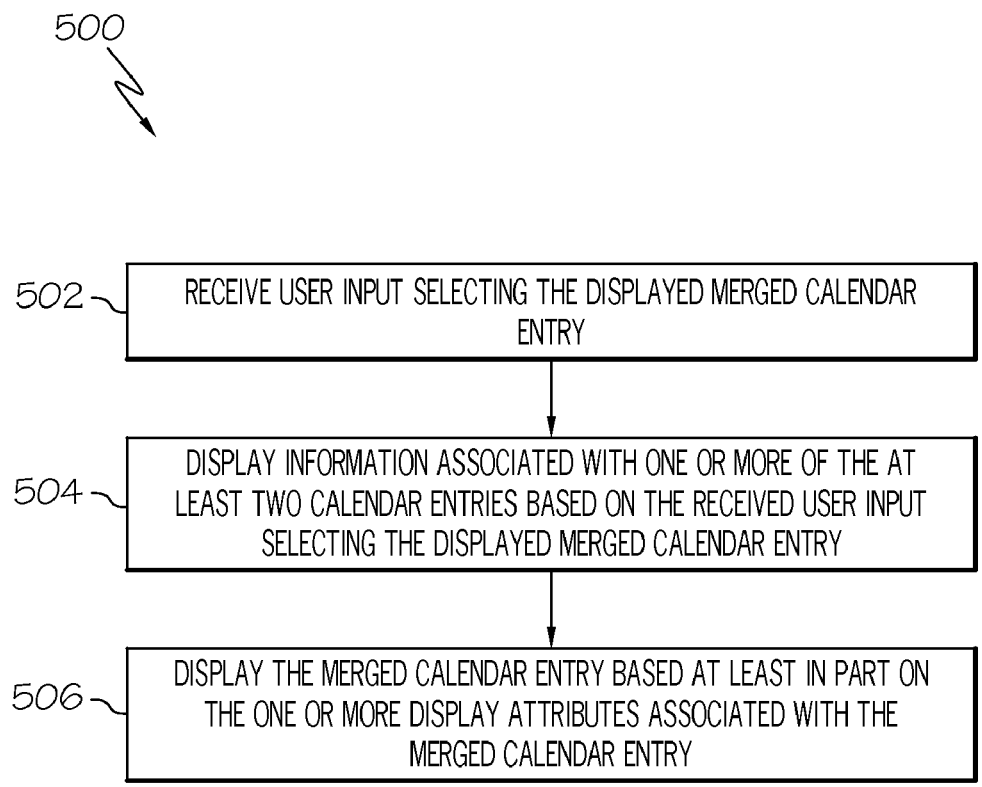
FIG. 5 is a flowchart of an example of a method for displaying details of a merged calendar entry based on user input in accordance with an embodiment of the present invention.

FIG. 5 is a flowchart of an example of a method 500 for displaying details of a merged calendar entry based on user input in accordance with an embodiment of the present invention. Method 500 takes place after, for example, method 100 has been conducted and a merged calendar entry has been created and displayed on the user's calendar. In block 502, an input device receives user input selecting the displayed merged calendar entry. For example, in one embodiment the input device is a pointing device such as a mouse and the user chooses a particular merged calendar entry by "hovering" the pointer over the top of the display of the merged calendar entry on the screen.

In block 504, the processing device instructs the display device to display information associated with one or more of the at least two calendar entries (i.e., the source calendar entries) based on the received user input selecting the displayed merged calendar entry. In this step, information related to the underlying source entries is displayed when the user keeps the mouse pointer over the merged entry. Once the user has finished reviewing the information, the processing device, as represented by block 506, instructs the display to display the merged calendar entry based at least in part on the one or more display attributes associated with the merged calendar entry.

Figure 6:
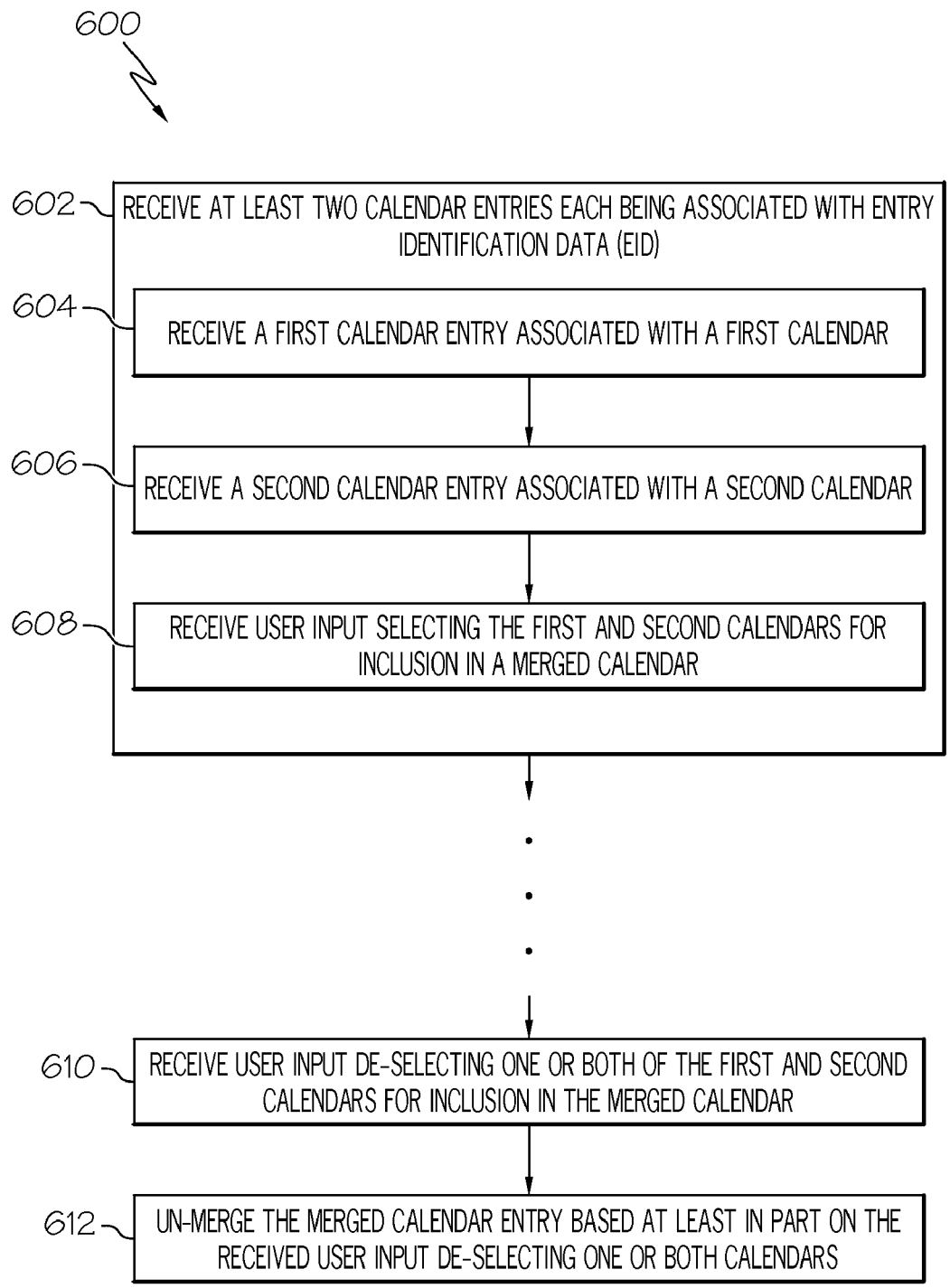
FIG. 6 is a flowchart of an example of a method for merging and un-merging calendar entries associated with multiple calendars in accordance with an embodiment of the present invention.

FIG. 6 is a flowchart of an example of a method 600 for merging and un-merging calendar entries associated with multiple calendars in accordance with an embodiment of the present invention. Block 602 corresponds with block 102 shown in FIG. 1 and represents the processing device receiving at least two calendar entries each being associated with EID. In this embodiment blocks 604, 606 and 608 represent sub-steps in the method 600. In block 604, the processing device receives a first calendar entry associated with a first calendar. The first calendar can also be referred to as a first source calendar. In block 606, the processing device receives a second calendar entry associated with a second calendar, which can also be referred to as a second source calendar. In block 608, the processing device receives user input selecting the first and second calendars for inclusion in a merged calendar. In various embodiments, additional source calendars are available for the user to select or choose not to select for inclusion in the merged calendar, which is also referred to as a consolidated calendar. In some embodiments and in some applications the user may choose to de-select a source calendar from inclusion in the merged calendar. In block 610, the processing device receives user input de-selecting one or both of the first and second calendars for inclusion in the merged calendar.

Any merged calendar entries associated with a de-selected source calendar must then be considered for un-merging. In the embodiment shown in FIG. 6, only two source calendars are present, but in other embodiments having multiple source calendars feeding into a single merged calendar entry, when a source calendar is de-selected, the merged calendar entry must be considered for un-merging. If the de-selected source calendar was a source for the merged calendar entry, then the merged calendar entry may be changed. If multiple source calendars for the merged entry are no longer selected for inclusion, then, as represented by block 612, the processing device un-merges the merged calendar entry based at least in part on the received user input de-selecting one or both calendars. If the de-selected source calendar was not a source for a merged calendar entry, then the merged calendar entry is maintained as a merged calendar entry. Furthermore, if two or more source calendars remain selected after de-selection of one or more other source calendars for a particular merged calendar entry, the information associated with the merged calendar entry is changed. For example, when the user selects the merged calendar entry to view its information as discussed above with reference to FIG. 5, the information displayed will indicate the source calendars for the merged entry and will not include the de-selected calendar(s).

In some embodiments, the user is given the choice to toggle the consolidated calendar between a "merged" state and an "un-merged" state. The "merged" state refers to the consolidated calendar displaying both merged calendar entries as well as un-merged calendar entries. The "merged" state typically is available after the various source entries have been compared based on one or more of methods 100, 200, 300, 400 and possibly others. The "un-merged" state refers to the consolidated calendar displaying no merged calendar entries but rather only unmerged calendar entries alongside potentially merge-able source entries. In other words, all individual calendar entries of those source calendars selected for inclusion are displayed without any merging.

Figure 7:
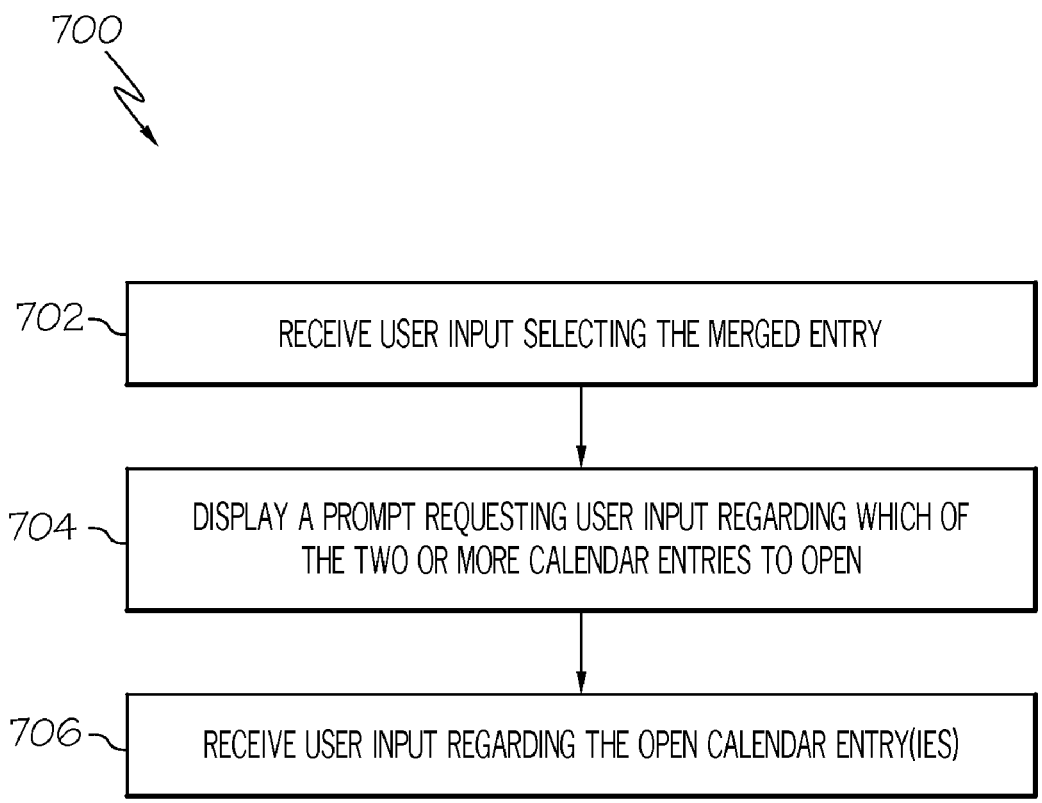
FIG. 7 is a flowchart of an example of a method for interacting with a user regarding choice of source calendar entries to open when a merged calendar entry is selected in accordance with an embodiment of the present invention.

FIG. 7 is a flowchart of an example of a method 700 for interacting with a user regarding choice of source calendar entries to open when merged calendar entry is selected in accordance with an embodiment of the present invention. In block 702, the processing device receives user input selecting the merged entry. As discussed above, user input is typically provided by the user to an input device coupled with the processing device. In block 704, the processing device instructs the display device to display a prompt requesting user input regarding which of the two or more calendar entries to open. In block 706, the processing device receives user input regarding the open calendar entry (or entries). The user input could include a variety of modifications such as, for example, changing the title of one of the source entries of the merged entry.

In some instances, the user's modification changes the source entry to such a degree that the source entry should no longer be merged with the merged entry. In such a case, in some embodiments, the processing device requests user input regarding the proper course of action and then accepts user input regarding whether to maintain the source entry as part of the merged calendar entry. In some instances, in particular those in which only two source entries are merged, the user's modifications change the source entry to a degree that un-merging is necessary. In some embodiments, the user is not given an opportunity to provide input regarding the proper course of action, but rather, the un-merging of the source entry, and potentially the entire merged entry, is performed automatically by the processing device. In other instances, of course, the user's modification(s) of the open calendar entry, which is one of the source entries of the merged entry, does not change the source entry to such a degree that un-merging is considered, but rather, the source entry is modified and remains merged with the saved modification. For example, if the user changes the title of the source entry but the change does not remove the source entry from the tolerance established for matching the title of the entry with the other source entries, the source entry automatically remains merged. In yet other embodiments, the user modification of a source entry never causes the source entry to be un-merged because it is assumed the source entry should be merged once it has been merged initially.

In another embodiment, the processing device determines which of the source entries the user would most likely desire open once the merged entry has been selected (block 702). For example, in one embodiment, the processing device presumes the user would prefer the user's calendar source entry to be opened as opposed to one or more of the other, non-user source entries. In other embodiments, the user can set rules regarding which source entry or entries to open upon selection of particular merged entries or all merged entries. In other embodiments, the rules for automatically determining which source entry or entries to open can be based on levels of access to the source calendars and/or entries, ownership of the source calendars and/or entries, priority and the like. For example, in one embodiment, the rule for opening entries includes always opening the source entry associated with the highest priority source calendar. In a similar embodiment, the rule for opening entries includes always opening the highest priority calendar for which the user is a chair and/or owner.

In various embodiments, groupings or sub-groupings of calendars are specified and acted on in varying ways. Typically, the user or an administrator is given the opportunity to categorize the groupings or sub-groupings and to define rules associated with the groupings or sub-groupings. For example, if a user always wants Calendar A and Calendar B to be merged but never wants Calendar C to be merged because it has some special significance such as being the user's personal calendar. The user can define Calendars A and B in a grouping and define merging rules for the grouping. Additionally, sub-groupings can be defined and rules created to control merging the sub-groupings. For example, if a user always wants a specific type of meeting to be merged but never wants another type of meeting to be merged, the meetings can be associated with particular sub-groupings and rules can be established based on the user's desires. As a more specific example, a user may not have a preference regarding whether entries chaired by Co-worker A are merged, but the user never wants entries chaired by Co-worker B to be merged. The processing system gives the user the ability to set-up appropriate sub-groupings and establish rules as desired. In other grouping examples, a user can create a grouping and establish rules such that only entries from specific source calendars are merged and no other entries are merged. In another example, the user can create grouping(s) and establish rules such that entries specifically tagged, defined, titled, summarized, described or the like are treated based on the rules. As a specific example, the user can establish a rule that all entries tagged as "client related" are merged.

In some instances, a user does not have access to all the rights associated with one or more source calendars. For example, a user may not have "write" access to a co-worker or supervisor's calendar, but the user does have "read" access to the calendar. In some cases, the user may choose to select a calendar with less than complete access for consolidation with the user's calendar. In one embodiment, for example, the user does not have full read rights in the source calendar, but the processing device recognizes whether an entry matches other entries in the user's calendar (assuming the calendars are selected for merging, etc.) and merges the entries in the user's calendar. For example, Co-worker A is attending a marketing team meeting, but the user does not have read access to Co-worker A's calendar. Typically, the user would receive a message such as, for example, "No Data Available" when attempting to read Co-worker A's calendar. However, in this embodiment, the processing device recognizes a matching entry and merges the entry with the appropriate entry or entries on the user's calendar. Such functionality could pose an information security risk in certain circumstances. Therefore, the processing device also allows users, in some embodiments, to opt-out of allowing other users to see otherwise "un-readable" entries via the merging functionality. In another example, when the user selects a merged calendar entry, for example, by double clicking the entry with a mouse, the user sees available actions (see FIG. 9I) for not only the user's source entry but also the other source entries unless the user does not have write access to one or more of the source entries. In such a case, the user would not, of course, be allowed to perform actions on that particular source calendar because of the user's lack of write access.

Figure 8:
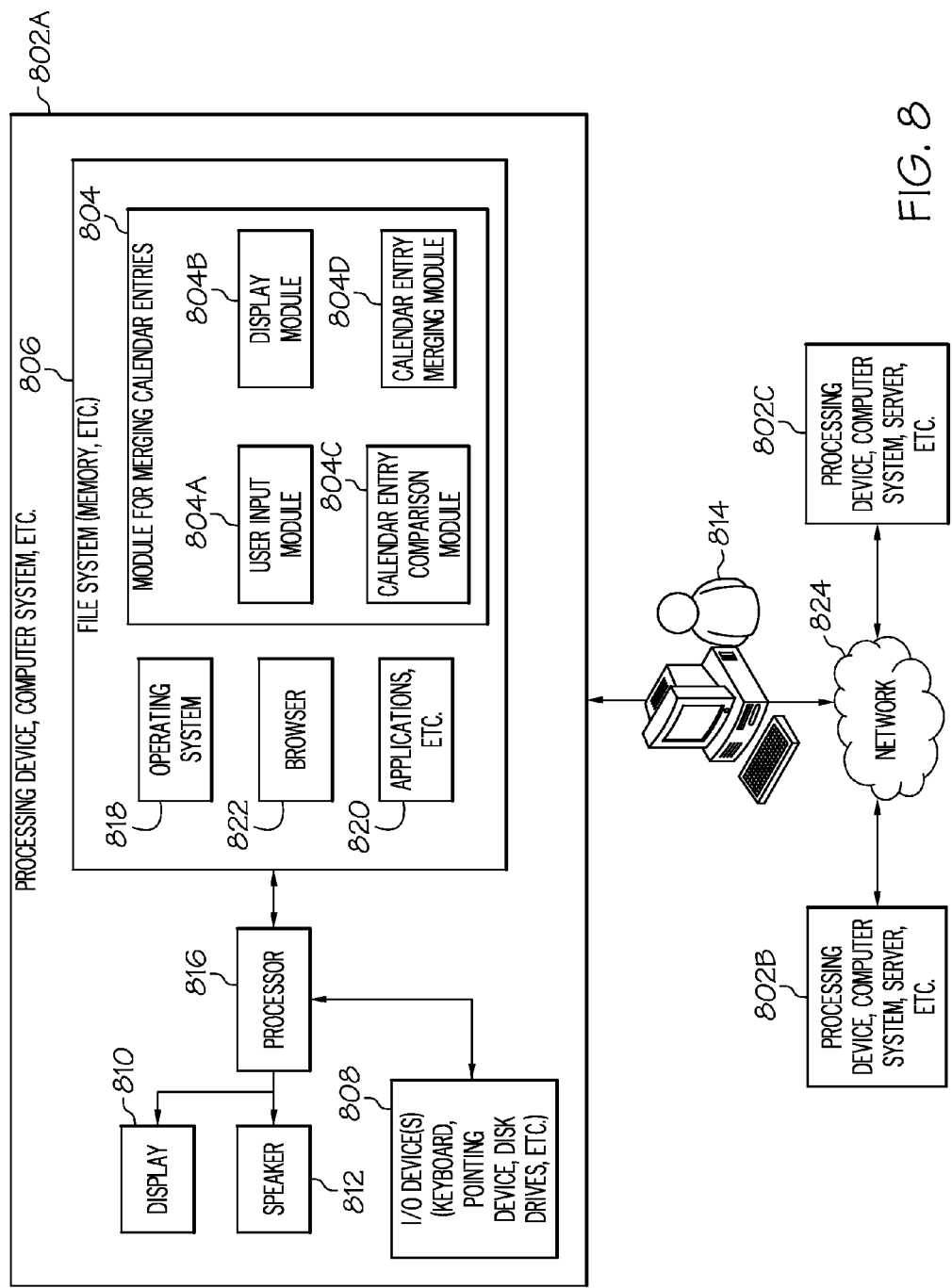
FIG. 8 is a block schematic diagram of an example of a system for merging calendar entries in accordance with an embodiment of the present invention.

FIG. 8 is a block schematic diagram of an example of a system 800 for merging calendar entries in accordance with an embodiment of the present invention. The methods 100, 200, 300, 400, 500, 600, and 700 of FIGS. 1, 2, 3, 4, 5, 6, and 7, respectively, may be embodied in or performed by the system 800. The system 800 may include one or more processing devices 802A, 802B, and 802C. Processing device 802A is representative of one embodiment of a processing device 802A that may be used in the system 800. The processing device 802A may be a computer system, server or similar processing device. A module 804 for merging calendar entries may be stored on or proximate the processing device 802A and may be operable on the processing device 802A for merging calendar entries as discussed herein.

In the embodiment shown, the module 804 is stored in a file system 806 collocated with the processing device 802A. Portions of or all of the methods 100, 200, 300, 400, 500, 600, and 700 may be embodied in or performed by the module 804 and/or its sub-modules. The sub-modules include a user input module 804A, a display module 804B, a calendar entry comparison module 804C, and a calendar entry merging module 804D. The user input module 804A, in some embodiments, includes computer readable code and may be operable on the processing device 802A for instructing I/O device(s) 808 as described herein. The display module 804B, in some embodiments, includes computer readable code and may be operable on the processing device 802A for instructing a display 810 and/or a speaker 812. The calendar entry comparison module 804C, in some embodiments, includes computer readable code and may be operable on the processing device 802A for performing various steps of the methods discussed above such as, but not limited to, steps 104, 106 and 108 of method 100 of FIG. 1. The calendar entry merging module 804D, in some embodiments, includes computer readable code and may be operable on the processing device 802A for performing various steps of the methods discussed above such as, but not limited to, step 110 of method 100 of FIG. 1. In various other embodiments a fewer or greater number of sub-modules are present in the module for merging calendar entries 804.

A user 814 of the system, an evaluator, a system administrator or similar individual may use the processing device 802A, 802B or 802C to merge calendar entries. The processing device 802A may include a processor 816 to control operation of the processing device 802A and the file system 806 or memory. An operating system 818, applications 820 and other programs may be stored on the file system 806 for running or operating on the processor 816. A web or Internet browser 822 may also be stored on the file system 806 for accessing the network 824, which can also be accessed by the processing device 802A in order to send and receive calendaring and scheduling actions as well as source calendars and source entries for populating a user's calendar with merged and un-merged calendar entries as described herein. The network 824 may be the Internet, an intranet or other private or proprietary network.

The processing device 802A may also include, as briefly mentioned above, a display 810 (or display device), a speaker system 812, and one or more input devices, output devices or combination input/output devices, collectively I/O devices 808. The I/O devices 808 may include a keyboard, pointing device, such as a mouse, disk drives and any other devices to permit a user, such as user 814, to interface with and control operation of the processing device 802A and to access the module 840 or system for merging calendar entries. The display 810 may present the user's calendar including merged and un-merged calendar entries from one or more source calendars as discussed herein.

FIGS. 9A-9I are screenshots of an exemplary implementation of one or more of methods 100, 200, 300, 400, 500, 600, and/or 700 discussed above in accordance with one or more embodiments of the present invention.

Figure 9A:
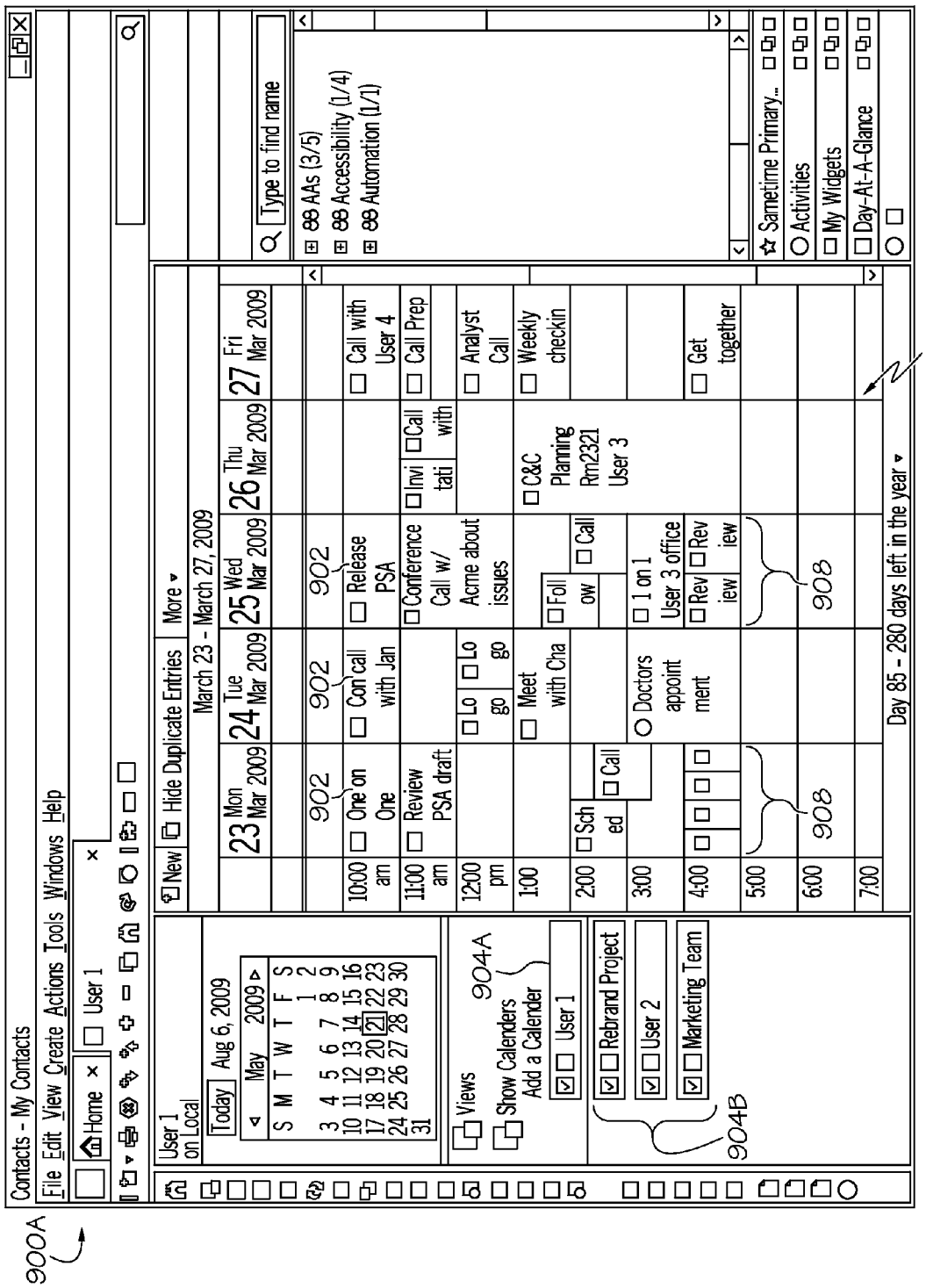
FIGS. 9A-9I are screenshots of exemplary implementations of one or more methods of FIGS. 1-7 in accordance with one or more embodiments of the present invention.
Figure 9B:
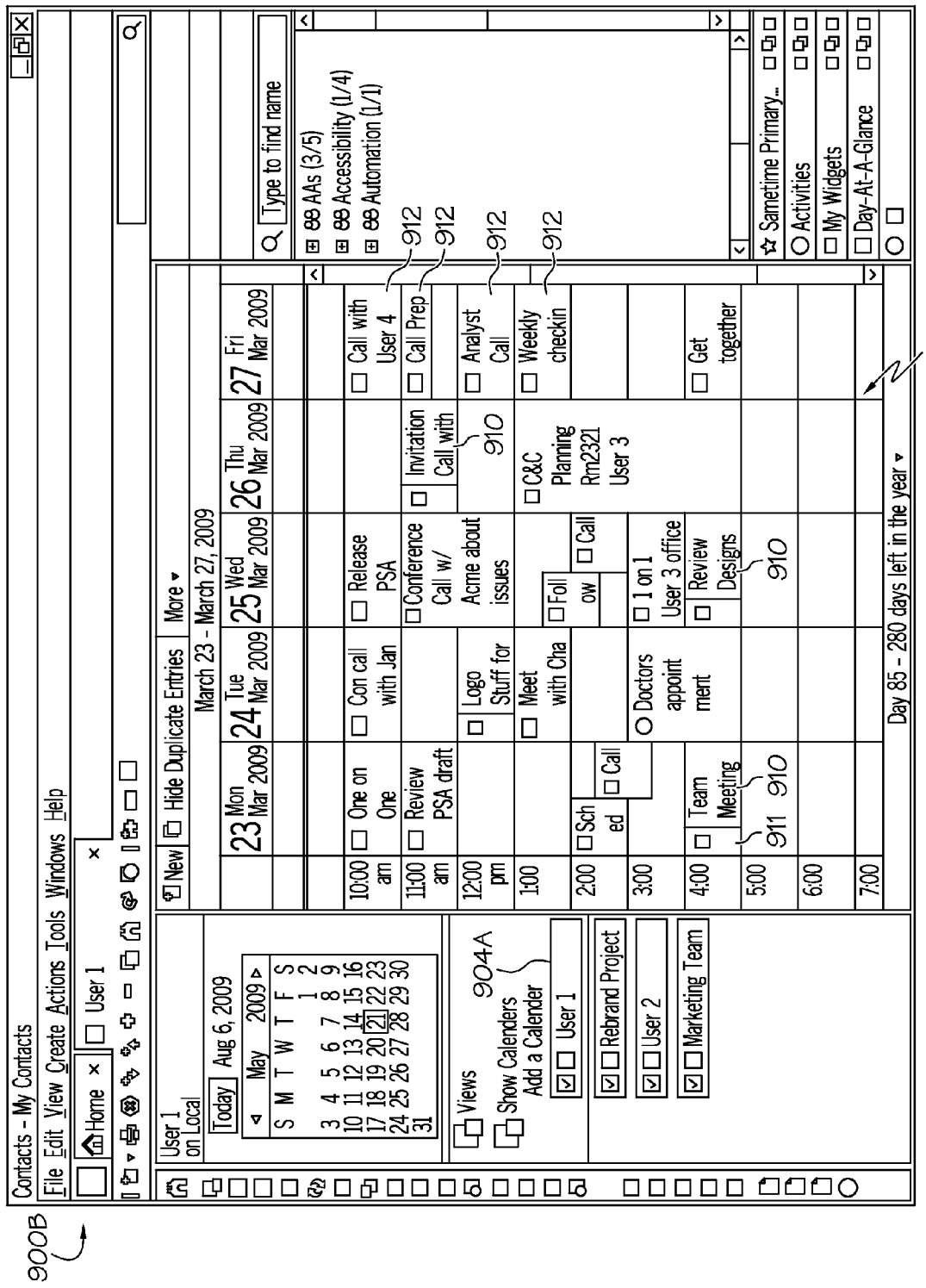
Figure 9C:
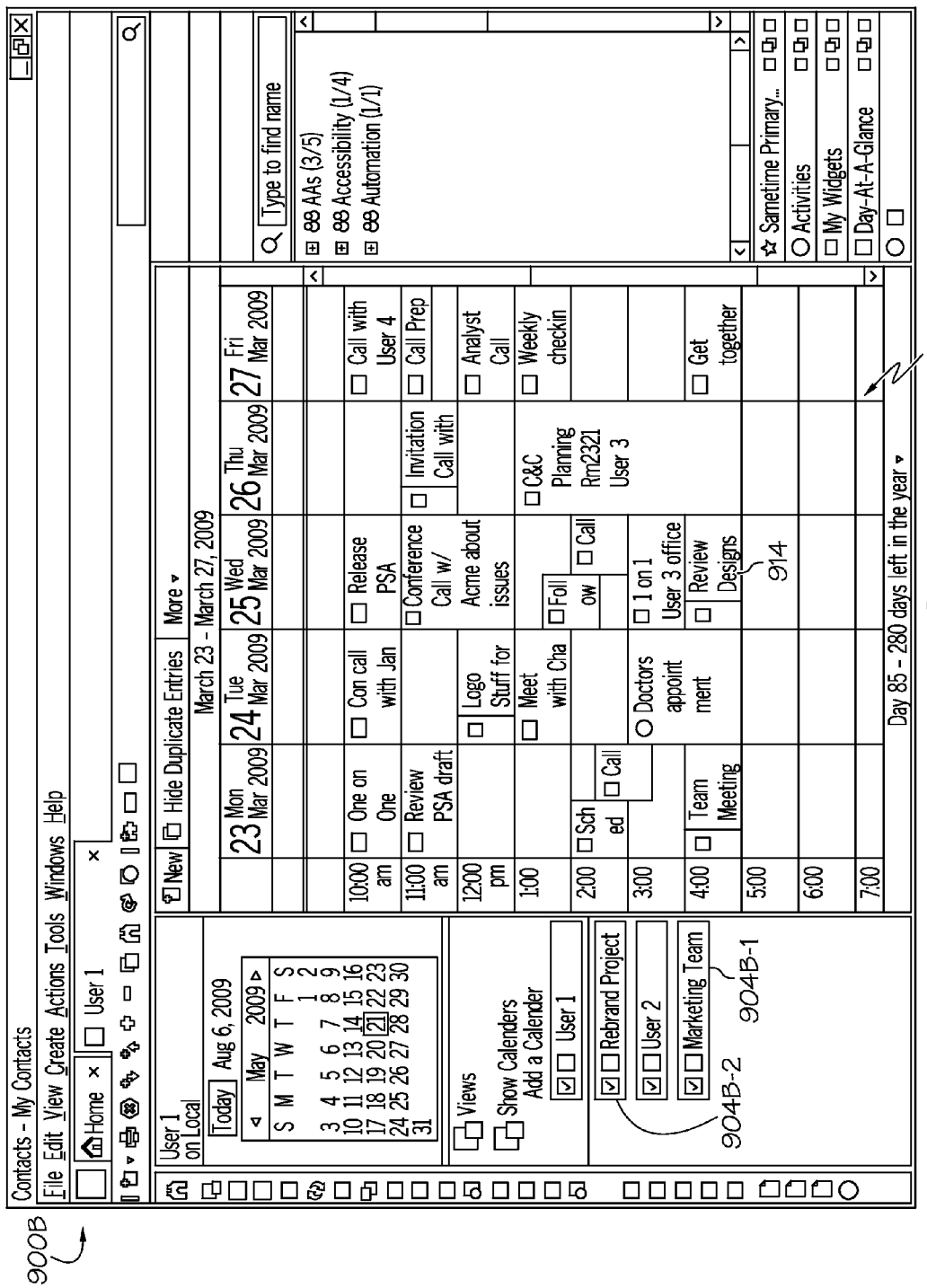

FIG. 9A is a screenshot 900A of an example of a user's consolidated calendar 906A showing numerous unmerged calendar entries 902. As shown on the left-hand side of the screen, the user is given an opportunity to select or de-select his personal calendar 904A in addition to three other source calendars 904B. Duplicate calendar entries 908 appear on the user's consolidated calendar 906A having different display attributes (in this case different colors associated with the corresponding source calendar), however, the duplicate calendar entries, having a limited window in which to populate, are smashed together and shrunken in size in order to accommodate all the duplicate entries.

FIG. 9B is a screenshot 900B of an example of a user's consolidated calendar 906B displaying both merged calendar entries 910 and un-merged calendar entries 912 in accordance with one embodiment of the present invention. The screenshot 900B is one embodiment of the user's calendar 906B after one or more of methods 100, 200, 300, 400, 500, 600 and/or 700 are executed. Referring concurrently to FIG. 4, the merged calendar entries 910 are displayed having one or more display attributes based at least in part on the one or more display attributes associated with the merged calendar entries (see block 416). The display attributes of the merged calendar entries 910 were determined based on a comparison of priorities of the source calendar entries (see block 412 and 414). In the embodiment of screenshot 900B of FIG. 9B, the user's personal calendar 904A has been assigned a predetermined priority greater than the other source calendars, and therefore, if the user's personal calendar is a source calendar for a merged calendar entry, then, in this embodiment, the merged calendar entry adopts the user's personal calendar source entry's display attributes. Accordingly, for example, in this embodiment the user's calendar is associated with a color and the merged calendar entry is therefore colored similarly. In this embodiment, when the merged calendar entries did not appear on the user's personal calendar, the merged calendar entry is colored white to indicate to the user its absence from his personal calendar. In this embodiment, the merged calendar entries are also indicated to the user by the additional display attribute of shading the left-hand portion 911 of the merged calendar entry 910. In other embodiments, of course, many different variations of display attributes and priority schemes can be used.

FIG. 9C is a screenshot 900C of an example of a user's consolidated calendar 906C wherein the user has de-selected a source calendar. In this example, the user has de-selected the "Marketing Team" calendar 904B-1. Referring concurrently to FIG. 6, block 610 represents the user de-selecting a source calendar and block 612 represents the processing device un-merging the merged calendar entry based on the user's de-selection, that is, if the merged calendar entry is no longer sourced by two or more source calendars. In the example screenshot, previously merged calendar entry 914 is now un-merged and colored similarly to its sole source calendar, the "Rebrand Project" calendar 904B-2.

Figure 9D:
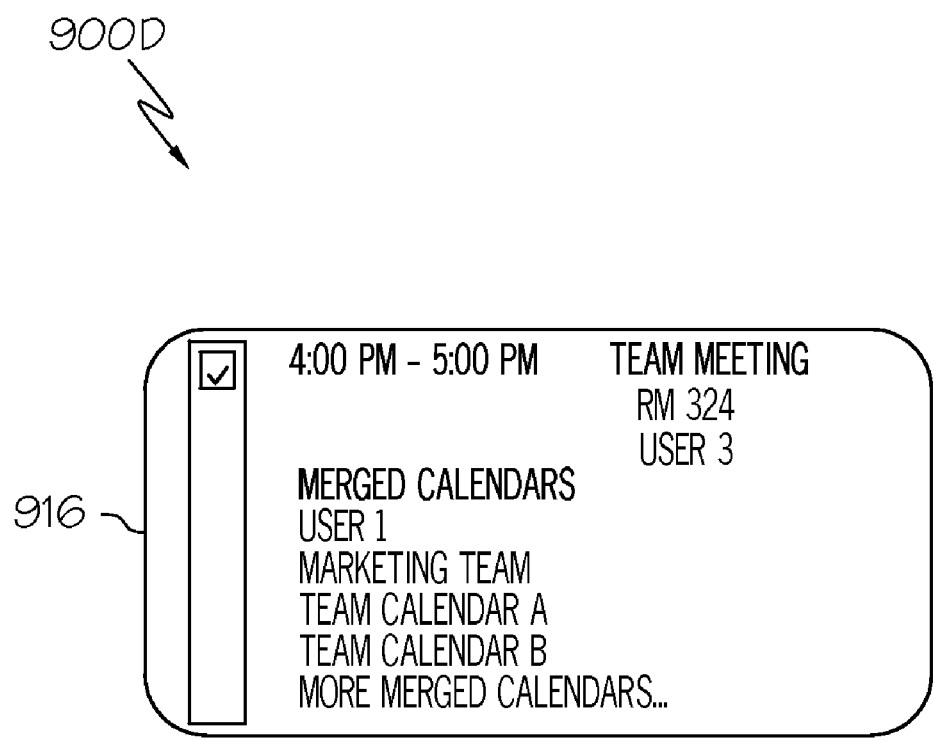

FIG. 9D is a screenshot 900D of a portion of a user's consolidated calendar 900D including a window 916 presenting an example of a merged calendar entry's details, attributes, information and/or the like. Referring concurrently to FIG. 5, the window 916 can be displayed pursuant to block 504, which represents the processing device instructing the display to display information associated with the source entries based on the user's selection of the merged calendar entry. Thus, when the user selects the merged entry, for example, by directing a pointing device such as a mouse to "hover" on the merged entry, the window 916 of information is displayed pursuant to block 504. In some embodiments, the user is allowed to modify the attributes of the merged calendar entry using the window 916. In such embodiments, the processing device receives user input modifying one or more attributes, and then, in block 506 displays the merged calendar entry based on the display attributes associated with the merged calendar entry, whether they have been changed or remain the same as before the user selected the merged calendar entry.

Figure 9E:
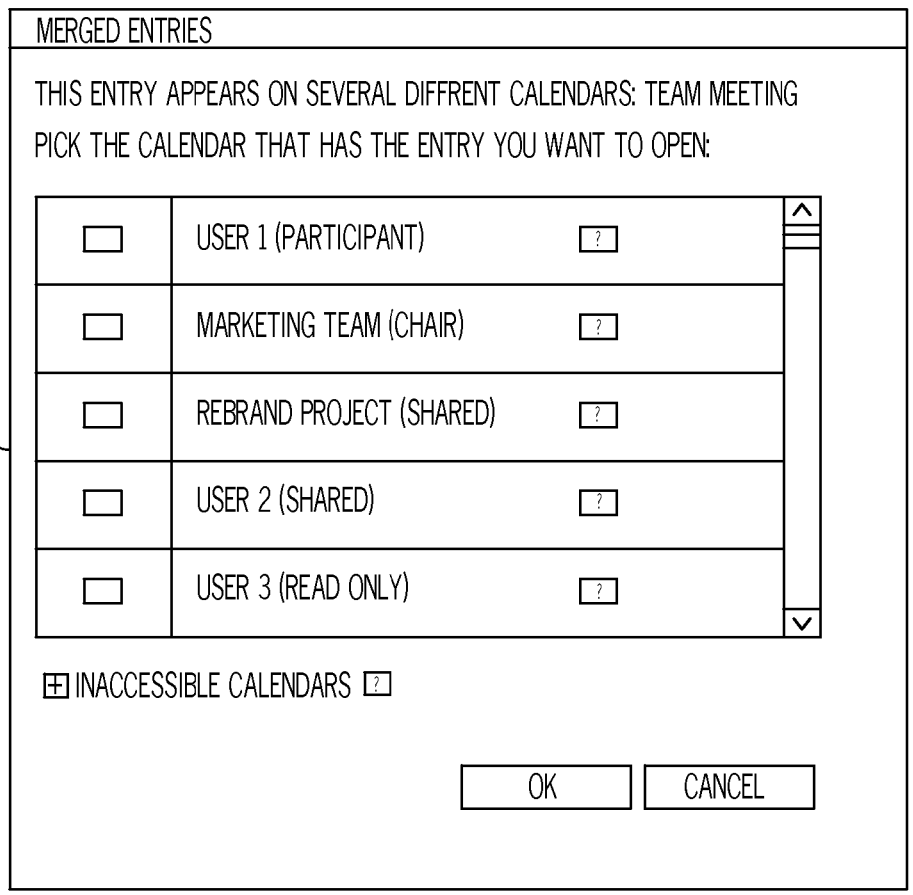

FIG. 9E is a screenshot 900E of a portion of a user's consolidated calendar including window 918 presenting information regarding a merged calendar entry. Referring concurrently to FIG. 7, the processing device receives input selecting the merged entry, such as by receiving a "double-click" input from a pointing device such as a mouse selecting the merged entry (see block 702). Then, the display prompts the user to choose which of the source calendars and/or source calendar entries to open (see block 704). In the embodiment of FIG. 9E, the prompt is "Pick the calendar that has the entry you want to open:" followed by a listing of the source calendars for the merged calendar entry. Finally, the user chooses which source calendar or source entry to open (see block 706). In some embodiments, the user is then allowed to modify the open source calendar and/or source entry.

Figure 9F:
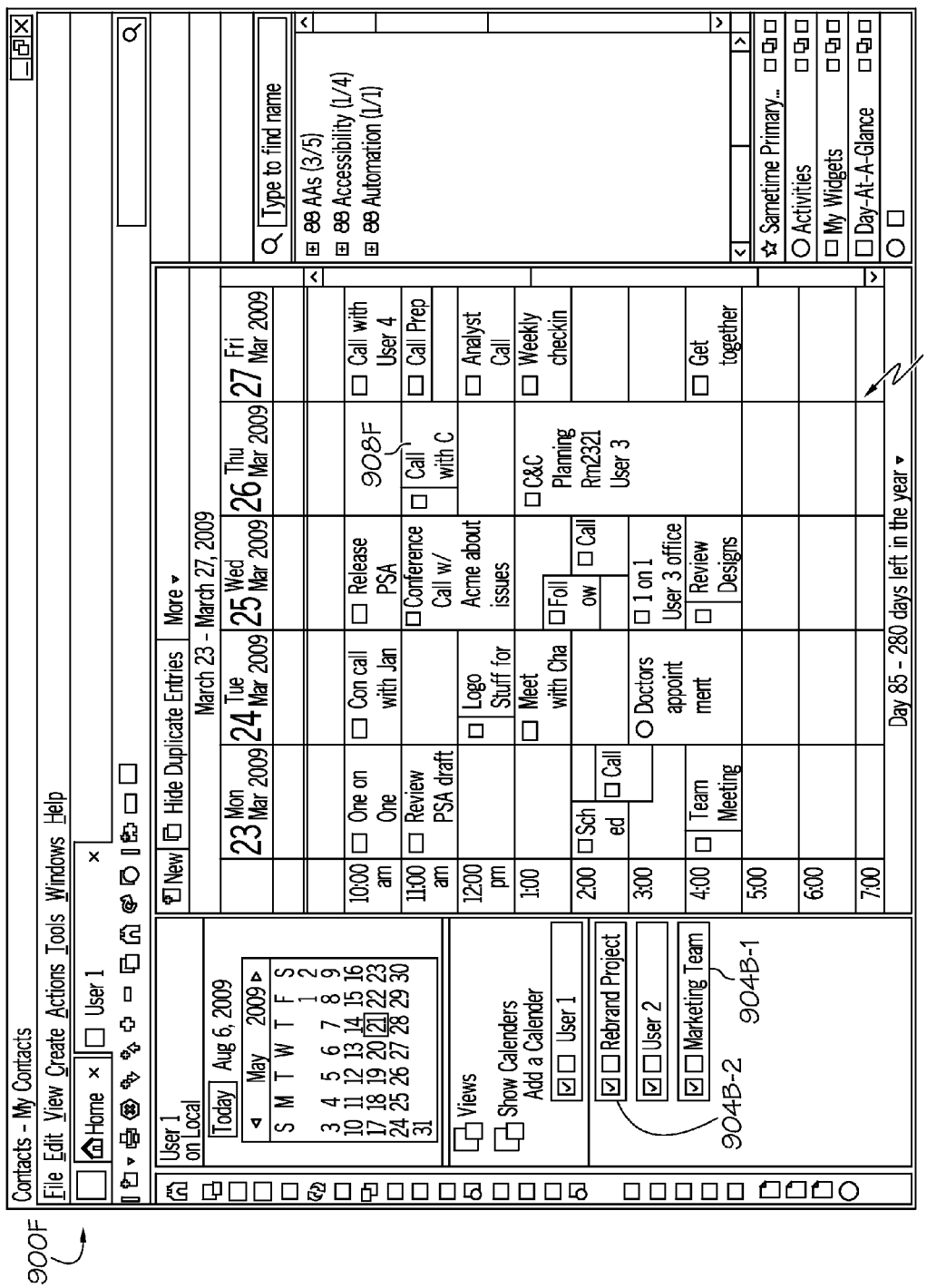
Figure 9G:
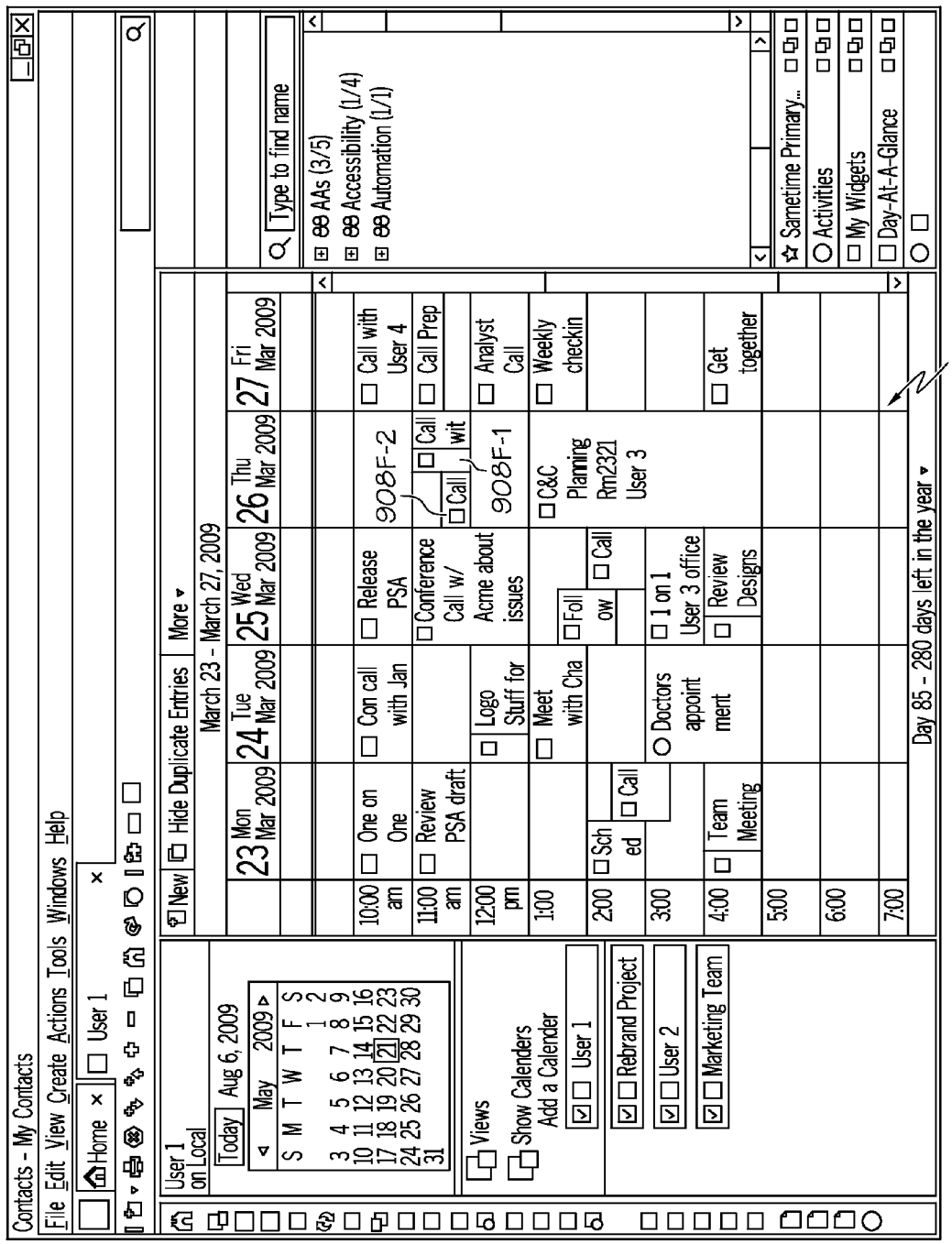

FIG. 9F is a screenshot 900F of an exemplary user's consolidated calendar 906F including a merged calendar entry 908F having as source calendars both the user's personal calendar 904A as well as the Marketing Team calendar 904B-1. FIG. 9G is a screenshot 900G of a user's consolidated calendar 906G including a modified version 908F-1 of the merged calendar entry 908F from FIG. 9F. The user, in this example, has selected the merged calendar entry, chosen his personal calendar source entry, and modified its start time. The previously merged calendar entry 908F has been split into a new merged calendar entry 908F-1 and the user's personal calendar source entry 908F-2. In other words, the user's personal version of the entry was modified to such a degree that it was necessary for the processing device to un-merge the personal version of the entry from the merged version of the entry. In an example where the user had modified other attributes, a similar result may occur, for example, if the end time had been modified. In an example where the user edited an attribute of another source entry, for example, the Marketing Team source entry start time, then that source entry may be un-merged. If the modified source entry constituted a modification to the originating entry or "owner" entry, then in some embodiments of the calendaring and scheduling workflow, this would constitute a "rescheduling" of the meeting, and therefore, appropriate communications would be sent to attendees. In such a case, typically the merged calendar entry 908F would retain its attributes and remain un-split, that is, the merged calendar entry 908F would not require un-merging because the user's personal calendar would, in some embodiments, be updated to reflect the "rescheduled" time of the meeting and would therefore coincide with the timing of the "owner" entry. In a case where the personal entry is not updated, an un-merge may be appropriate to account for varying timing Of course, these examples involve time attributes, but other attributes, for example textual attributes or others would be handled in a similar fashion.

Figure 9H:
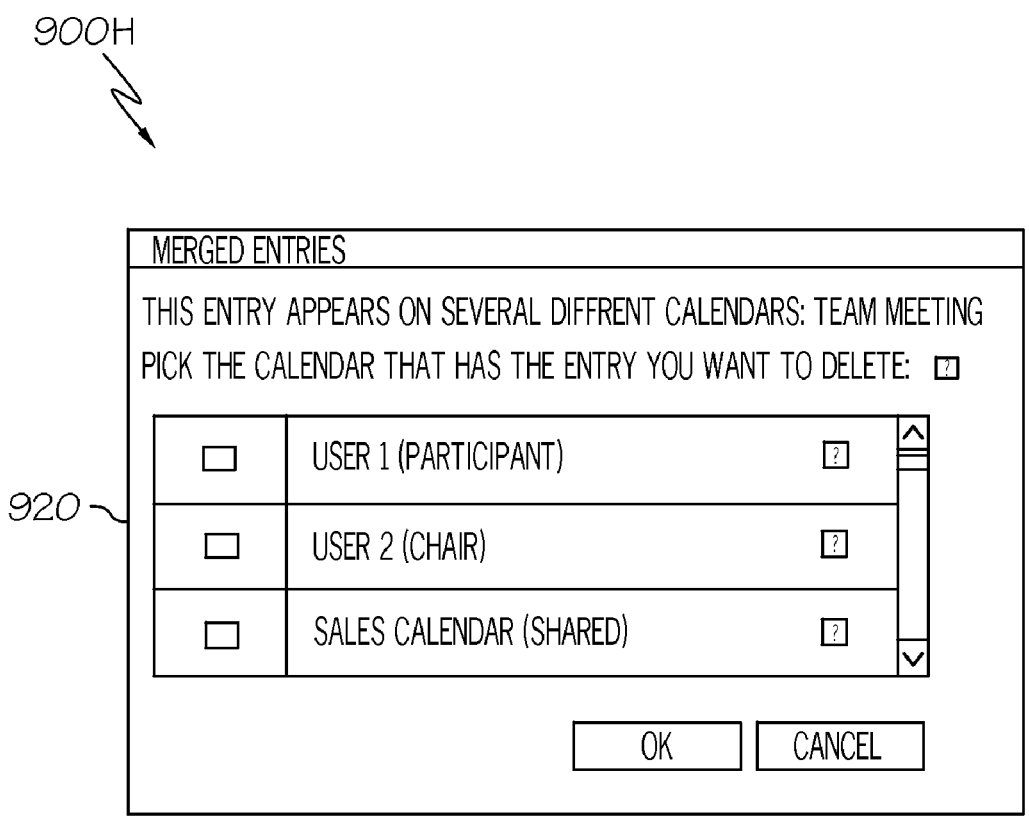

FIG. 9H is a screenshot 900H of a portion of a user's consolidated calendar including a window 920. Window 920 represents an example of a user prompt for an "umbrella" action. In this particular example, a delete command is shown. An "umbrella" action is one in which the action is common regardless of the merged entries and such actions typically allow the user to perform the umbrella action on all source entries merged in a merged calendar entry. The window, in this example, is displayed when a user selects a merged calendar entry and then inputs a delete command such as by depressing the delete key on a keyboard. As shown, the user is prompted to "Pick the calendar that has the entry you want to delete:" followed by a listing of the source calendars for the merged calendar entry. The processing device receives user input regarding which calendar having the desired source entry and deletes the chosen entry. In other embodiments, the user is given the option of choosing to delete the entire merged calendar entry. In various other instances, the user provides other commands regarding the selected merged calendar entry which are handled in a similar fashion. For example, in one other instance, the user selects the merged calendar entry and depresses the print screen key on the keyboard. In one embodiment, the processing device recognizes this command and instructs a printer to print the details of the merged calendar entry. In another embodiment, the user is prompted to confirm the command to print the details of the merged calendar entry. In another embodiment, for example, a drag and drop command, such as selecting the entry with a pointing device and moving it to another date and/or time on the calendar, is considered an umbrella action that modifies all of the source entries merged in the merged calendar entry. In various instances, many different commands and/or user inputs are possible umbrella actions, and are generally handled in a similar fashion as described above regarding the present examples. However, in most instances, the user must have the appropriate permissions to modify the source entries in order for each particular source entry to be available for modification by the user, by umbrella action or otherwise.

Figure 9I:
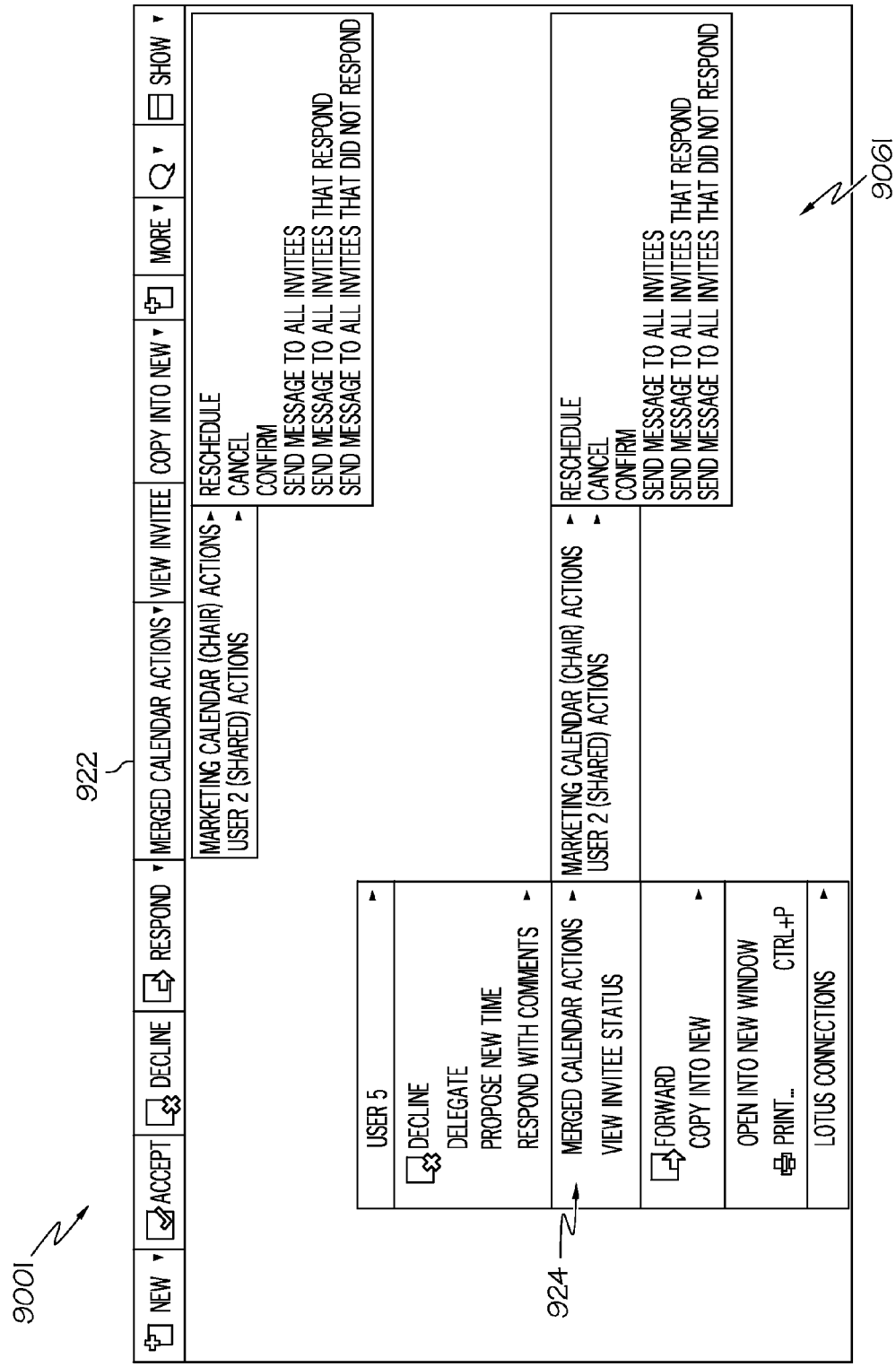

FIG. 9I is a screenshot 900I of a portion of an exemplary user's consolidated calendar 906I including an action bar 922. The action bar 922 in some embodiments is presented to the user once a merged calendar entry is selected. As shown in this embodiment, numerous actions are available for the user including various calendaring and scheduling actions such as rescheduling, canceling, and confirming to name a few. On the lower half of the screenshot 900I, a shortcut window 924 that appears when the user selects, for example, by right-clicking with a mouse pointing device on the merged calendar entry. The shortcut window 924 provides similar functionality to the action bar 922.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to embodiments of the invention in the form disclosed. Many modifications and variations will be apparent to those of ordinary skill in the art without departing from the scope and spirit of embodiments of the invention. The embodiment was chosen and described in order to best explain the principles of embodiments of the invention and the practical application, and to enable others of ordinary skill in the art to understand embodiments of the invention for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the invention have other applications in other environments. This application is intended to cover any adaptations or variations of the present invention. The following claims are in no way intended to limit the scope of embodiments of the invention to the specific embodiments described herein.

What is claimed is:

1. A method, operable on a processing device, for displaying calendar entries, the method comprising:
   receiving, by the processing device, a plurality of calendar entries associated with a plurality of calendars, each entry associated with entry identification data, wherein at least a first calendar entry of the plurality of calendar entries is associated with a first calendar and a second calendar entry of the plurality of calendar entries is associated with a second calendar, the first and second calendars each being selected by a user for inclusion in a merged calendar;
   comparing, by the processing device, at least a portion of the entry identification data associated with each of the calendar entries;
   creating and displaying a merged calendar entry on the merged calendar from the plurality of calendar entries from the plurality of calendars that are determined duplicative based on comparing of at least a portion of the entry identification data for each of the plurality of calendar entries, and further displaying those of the plurality of calendar entries that are not duplicative based on such comparing;
   receiving, by the processing device, user input selecting the merged calendar entry;
   receiving, by the processing device, user input selecting one of the duplicative calendar entries; and
   receiving, by the processing device, user input regarding action to take on the selected duplicative calendar entry.

2. The method of claim 1 further comprising comparing, by the processing device, at least one time attribute associated with each of the calendar entries, wherein creating and displaying the merged the calendar entry is based at least in part on comparing at least the portion of the entry identification data associated with each of the calendar entries and at least in part on comparing the at least one time attribute associated with each of the calendar entries.

3. The method of claim 2 wherein the at least one time attribute comprise one of a start time associated with each of the calendar entries and an end time associated with each of the calendar entries.

4. The method of claim 1 further comprising comparing, by the processing device, at least one textual attribute associated with each of the calendar entries, wherein creating and displaying the merged calendar entry is based at least in part on comparing the at least one textual attribute associated with each of the calendar entries.

5. The method of claim 4 wherein the at least one textual attribute comprises one of a summary of the entry and a description of the entry.

6. The method of claim 4 further comprising comparing, by the processing device, at least one time attribute associated with each of the calendar entries, wherein creating and displaying the merged calendar entry is based at least in part on comparing at least a portion of the entry identification data associated with each of the calendar entries, based at least in part on comparing the at least one time attribute associated with each of the calendar entries, and based at least in part on comparing the at least one textual attribute associated with each of the calendar entries.

7. The method of claim 1 wherein:
the plurality of calendar entries are each associated with at least one display attribute,
the plurality of calendar entries are each associated with a predetermined priority,
the creating and displaying the merged calendar entry comprises comparing the predetermined priorities of each of the calendar entries;
wherein the method further comprises associating one of the at least one display attributes with the merged calendar entry based at least in part on the comparison of the predetermined priorities of the calendar entries and at least in part on the at least one display attribute associated with each of the calendar entries; and
wherein instructing, by the processing device, a display device to display the merged calendar entry is based at least in part on the one of at least one display attributes associated with the merged calendar entry.

8. The method of claim 1 wherein a first calendar entry of the plurality of calendar entries is associated with a first calendar and a second calendar entry of the plurality of calendar entries is associated with a second calendar, the first and second calendars each being selected by a user for inclusion in a merged calendar, and wherein creating and displaying the merged calendar entry comprises instructing, by the processing device, a display device to display the merged calendar entry as part of the merged calendar.

9. The method of claim 1 further comprising:
instructing, by the processing device, the display device to display information associated with at least one of the plurality of calendar entries based on the received user input selecting the displayed merged calendar entry.

10. The method of claim 1 further comprising: un-merging, by the processing device, the merged calendar entry based at least in part on input from the user deselecting one or both of the first and second calendars for inclusion in the merged calendar.

11. The method of claim 1 further comprising: un-merging, by the processing device, at least a portion of the merged calendar entry based at least in part on input from the user changing at least one time attribute associated with at least one of the calendar entries.

12. The method of claim 1 further comprising:
instructing, by the processing device, a display device, to display a prompt requesting user input regarding which of the duplicative two calendar entries to open.

13. A processing device comprising:
a processor configured to receive a plurality of calendar entries associated with a plurality of calendars, each entry associated with entry identification data, wherein at least a first calendar entry of the plurality of calendar entries is associated with a first calendar and a second calendar entry of the plurality of calendar entries is associated with a second calendar, the first and second calendars each being selected by a user for inclusion in a merged calendar;
a module operable on the processor for displaying calendar entries, the module comprising:

a module for comparing at least a portion of the entry identification data associated with each of the calendar entries; and
a module for creating and displaying a merged calendar entry on the merged calendar from the plurality of calendar entries from the plurality of calendars that are determined duplicative based on comparing at least the portion of the entry identification data for each of the plurality of calendar entries, and further for displaying those of the plurality of calendar entries that are not duplicative based on such comparing;
a module for receiving user input selecting the merged calendar entry and for receiving user input selecting one of the duplicative calendar entries and for receiving user input regarding action to take on the selected duplicative calendar entry.

14. The processing device of claim 13 wherein the module operable on the processing device for displaying calendar entries further comprises a module for comparing at least one time attribute associated with each of the calendar entries, wherein the module for creating and displaying a merged calendar entry creates and displays based at least in part on the comparing of at least the portion of the entry identification data associated with each of the calendar entries and at least in part on the comparing of the at least one time attribute associated with each of the calendar entries.

15. The processing device of claim 13 wherein the module operable on the processing device for displaying calendar entries further comprises a module for comparing at least one textual attribute associated with each of the calendar entries, wherein the module for creating and displaying a merged calendar entry creates and displays based at least in part on the comparing of the at least one textual attribute associated with each of the calendar entries.

16. The processing device of claim 13 wherein the module operable on the processing device for displaying calendar entries further comprises a module for comparing at least one time attribute associated with each of the calendar entries,
wherein the module for creating and displaying a merged calendar entry creates and displays based at least in part on the comparing of at least the portion of the entry identification data associated with each of the calendar entries, based at least in part on the comparing of the at least one time attribute associated with each of the calendar entries, and based at least in part on the comparing of the at least one textual attribute associated with each of the calendar entries.

17. The processing device of claim 13 wherein a first of the calendar entries of the plurality of calendar entries is associated with a first calendar and a second of the calendar entries of the plurality of calendar entries is associated with a second calendar, the first and second calendars each being selected by a user for inclusion in a merged calendar, the processing device further comprising a module for communicating instructions for displaying the merged calendar entry as part of the merged calendar.

18. A computer program product for displaying calendar entries, the computer program product comprising:
a computer readable storage medium having computer readable program code embodied therewith, the computer readable program code comprising:
computer readable program code configured to receive a plurality of calendar entries associated with a plurality of calendars, each entry associated with entry identification data, wherein at least a first calendar entry of the plurality of calendar entries is associated with a first calendar and a second calendar entry of the plurality of calendar entries is associated with a second calendar, the first and second calendars each being selected by a user for inclusion in a merged calendar;

computer readable program code configured to compare at least a portion of the entry identification data associated with each of the calendar entries;

computer readable program code configured to create and display a merged calendar entry on the merged calendar from the plurality of calendar entries from the plurality of calendars that are determined duplicative based on comparing at least a portion of the entry identification data and further displaying those of the plurality of calendar entries that are not duplicative based on such comparing;

computer readable program code configured to receive user input selecting the merged calendar entry;

computer readable program code configured to receive user input selecting one of the duplicative calendar entries; and computer readable program code configured to receive user input regarding action to take on the selected duplicative calendar entry.

19. The computer program product of claim 18, the computer readable program code further comprising:

computer readable program code configured to compare at least one time attribute associated with each of the calendar entries, wherein the computer readable program code configured to create and display a merged calendar entry is configured to create and display based at least in part on comparing of at least the portion of the entry identification data associated with each of the calendar entries and at least in part on the comparison of the at least one time attribute associated with each of the calendar entries.

20. The computer program product of claim 19, the computer readable program code further comprising:

computer readable program code configured to compare at least one textual attributes associated with each of the calendar entries, wherein the computer readable program code configured to create and display a merged calendar entry is configured to create and display based at least in part on the comparison of the at least one textual attribute associated with each of the calendar entries.

21. The computer program product of claim 20, the computer readable program code further comprising:

computer readable program code configured to compare at least one time attribute associated with each of the entries, wherein the computer readable program code configured to create and display a merged calendar entry is configured to create and display based at least in part on the comparison of at least the portion of the entry identification data associated with each of the calendar entries, based at least in part on the comparison of the at least one time attribute associated with each of the calendar entries, and based at least in part on the comparison of the at least one textual attribute associated with each of the calendar entries.

22. The computer program product of claim 18, wherein a first calendar entry of the plurality of calendar entries is associated with a first calendar and a second calendar of the plurality of calendar entries is associated with a second calendar, the first and second calendars each being selected by a user for inclusion in a merged calendar, the computer readable program code further comprising computer readable program code configured to communicate instructions for displaying the merged calendar entry as part of the merged calendar.

23. A method, operable on a processing device, for merging calendar entries, the method comprising:

receiving, by the processing device, a plurality of calendar entries associated with a plurality of calendars, each entry associated with entry identification data, wherein at least a first calendar entry of the plurality of calendar entries is associated with a first calendar and a second calendar entry of the plurality of calendar entries is associated with a second calendar, the first and second calendars each being selected by a user for inclusion in a merged calendar;

comparing, by the processing device, at least a portion of the entry identification data associated with each of the calendar entries;

comparing, by the processing device, at least one time attribute associated with each of the plurality of calendar entries;

comparing, by the processing device, at least one textual attribute associated with each of the plurality of calendar entries;

creating and displaying a merged calendar entry on the merged calendar from the plurality of calendar entries from the plurality of calendars that are determined duplicative based on comparing of at least a portion of the entry identification data for each of the plurality of calendar entries, and further displaying those of the plurality of calendar entries that are not duplicative based on such comparing;

receiving, by the processing device, user input selecting the merged calendar entry;

receiving, by the processing device, user input selecting one of the duplicative source calendar entries; and receiving, by the processing device, user input regarding action to take on the selected duplicative calendar entry.

24. The method of claim 23 wherein a first calendar entry of the plurality of calendar entries is associated with a first calendar and a second calendar entry of the plurality of calendar entries is associated with a second calendar, the first and second calendars each being selected by a user for inclusion in a merged calendar, and wherein displaying the merged calendar entry comprises instructing, by the processing device, a display device to display the merged calendar entry as part of the merged calendar.

* * * * *